(12) United States Patent
Evans et al.

(10) Patent No.: US 7,490,221 B2
(45) Date of Patent: Feb. 10, 2009

(54) SYNCHRONIZATION BETWEEN PIPELINES IN A DATA PROCESSING APPARATUS UTILIZING A SYNCHRONIZATION QUEUE

(75) Inventors: Martin Robert Evans, Cambridge (GB); Ian Victor Devereux, Cambridge (GB)

(73) Assignee: ARM Limited, Cambridge (GB)

( * ) Notice: Subject to any disclaimer, the term of this patent is extended or adjusted under 35 U.S.C. 154(b) by 845 days.

(21) Appl. No.: 10/601,575

(22) Filed: Jun. 24, 2003

(65) Prior Publication Data
US 2004/0044878 A1 Mar. 4, 2004

(30) Foreign Application Priority Data
Sep. 4, 2002 (GB) ................. 0220559.9

(51) Int. Cl.
*G06F 15/00* (2006.01)
*G06F 15/76* (2006.01)
(52) U.S. Cl. .................... 712/34; 708/508; 708/509
(58) Field of Classification Search ............... 712/205, 712/206, 207, 208, 203, 34; 708/508, 509
See application file for complete search history.

(56) References Cited

U.S. PATENT DOCUMENTS 5,197,140 A * 3/1993 Balmer ................. 711/220
5,241,635 A    8/1993 Papadopoulos et al.

(Continued)

FOREIGN PATENT DOCUMENTS

EP   0 212 499 A2   3/1987

OTHER PUBLICATIONS

Patent Abstracts of Japan vol. 2000, No. 22 (JP 2001-147806) Mar. 2001, "Method for Synchronizing Operation of CPU Pipe Line and FPU Pipe Line and Computer System" Hitachi Ltd.
S. Manoharan, "Trace-Driven Simulation of Decoupled Architectures" *Proceedings of the 27th Annual Hawaii International Conference on System Sciences*, Jan. 1994, pp. 271-278.

(Continued)

*Primary Examiner*—Alford W Kindred
*Assistant Examiner*—Chun-Kuan Lee
(74) *Attorney, Agent, or Firm*—Nixon & Vanderhye P.C.

(57) ABSTRACT

The technology described provides a technique for synchronization between pipelines in a data processing apparatus. The data processing apparatus comprises a main processor operable to execute a sequence of instructions, the main processor comprising a first pipeline having a first plurality of pipeline stages, and a coprocessor operable to execute coprocessor instructions in said sequence of instructions. The coprocessor comprises a second pipeline having a second plurality of pipeline stages, and each coprocessor instruction is arranged to be routed through both the first pipeline and the second pipeline. Furthermore, at least one synchronizing queue is provided coupling a predetermined pipeline stage in one of the pipelines with a partner pipeline stage in the other of the pipelines, the predetermined pipeline stage being operable to cause a token to be placed in the synchronizing queue when processing a coprocessor instruction, and the partner pipeline stage being operable to process that coprocessor instruction upon receipt of the token from the synchronizing queue. By this approach, the first and second pipelines are synchronized between the predetermined pipeline stage and the partner pipeline stage, and hence ensures that the pipelines are correctly synchronized for crucial transfers of information without requiring that strict synchronization at all stages is necessary.

41 Claims, 15 Drawing Sheets

U.S. PATENT DOCUMENTS

| | | | |
|---|---|---|---|
| 5,430,850 A | | 7/1995 | Papadopoulos et al. |
| 5,860,000 A | | 1/1999 | Biswas et al. |
| 6,061,749 A | * | 5/2000 | Webb et al. .................... 710/65 |
| 6,112,017 A | * | 8/2000 | Wise .......................... 712/200 |
| 6,240,508 B1 | * | 5/2001 | Brown et al. ................. 712/219 |
| 6,381,692 B1 | * | 4/2002 | Martin et al. ............... 712/244 |
| 6,477,638 B1 | * | 11/2002 | Gearty et al. ............... 712/220 |

OTHER PUBLICATIONS

Translation of Japanese official action, Nov. 6, 2006, in corresponding Japanese Application No. 2004-533589.

Abstract of Japanese Publication No. JP2001147809, Glenn et al., "Method System and Method for Deciding Existence of FPU in Computer System", May 29, 2001.

* cited by examiner

FIG. 12

SYNCHRONIZATION BETWEEN PIPELINES IN A DATA PROCESSING APPARATUS UTILIZING A SYNCHRONIZATION QUEUE

BACKGROUND OF THE INVENTION

1. Field of the Invention

The present invention relates to a technique for achieving synchronisation between pipelines in a data processing apparatus.

2. Description of the Prior Art

It is known to provide a data processing apparatus with a main processor that takes the form of a pipelined processor having a plurality of pipeline stages. This enables multiple instructions to be in the process of execution by the main processor at any point in time. During the execution of any particular instruction, that instruction will pass through the various pipeline stages of the main processor, execution of that instruction typically completing when the instruction is processed through the final pipeline stage of the main processor, at which point the status of the data processing apparatus is updated to reflect the result of execution of that instruction. As an example, the contents of one or more registers of a register bank accessible by the main processor may be updated dependent on the result of execution of the instruction.

It is also known to provide a data processing apparatus with one or more coprocessors for executing particular coprocessor instructions that appear in a sequence of instructions to be executed by the data processing apparatus. In situations where the main processor has a pipelined architecture, it is also common for the coprocessor to have a pipelined architecture, and hence for the coprocessor to also have a plurality of pipeline stages through which a coprocessor instruction is processed in order to execute that coprocessor instruction. Typically, each coprocessor instruction is arranged to be routed through both the pipeline of the main processor and the pipeline of the coprocessor. The coprocessor is intended to run more or less in step with the main processor, and accordingly steps have been taken to keep the coprocessor pipeline synchronised with the main processor pipeline.

The need for synchronisation stems from the fact that there is a need for interaction between the various pipeline stages of the main processor and the various pipeline stages of the coprocessor during execution of a coprocessor instruction. For example, coprocessor instructions may be cancelled by the main processor if a condition code specified by the coprocessor instruction is not met, or the entire coprocessor pipeline may need to be flushed in the event of a mispredicted branch that has resulted in the coprocessor instruction being executed. Further, data may need to be passed between the main processor and the coprocessor in the event that the coprocessor instructions define load or store operations.

Up to now, coprocessor pipelines have been kept synchronised with the main processor pipeline by passing signals with fixed timing from one pipeline to the other. These signals mainly cause stalls in one pipeline when the other pipeline stalls, in order to maintain synchronisation. However, there are other complicating factors, for example when the main pipeline needs to cancel the coprocessor instruction, or the pipelines need to be flushed, which significantly complicate the interactions between the main processor and the coprocessor when they interact with stalls. As the length of pipelined processors has increased, it has become more and more difficult to achieve synchronisation between pipelines using this tightly coupled scheme involving the passing of signals with fixed timing between the pipelines.

A major constraint imposed upon the coprocessor interface is that it must operate over a two cycle delay, that is any signal passing from the main processor to the coprocessor, or vice versa, must be given a whole clock cycle to propagate from one to the other, and hence cannot be actioned until the following clock cycle. This means that a signal crossing the interface must be clocked out of a register on one side of the interface and clocked directly into another register on the other side, and no combinatorial process must intervene. This constraint arises from the fact that the main processor (also referred to herein as the processor core) and the coprocessor may be placed a considerable distance apart and generous timing margins must be allowed for to cover signal propagation times. This is particularly true in situations where the coprocessor may be designed separately to the design of the main processor, for example by a different party. This delay in signal propagation makes it difficult to maintain pipeline synchronisation using the earlier described tightly coupled synchronisation technique.

Accordingly, it would be desirable to provide an improved technique for obtaining synchronisation between pipelines in a data processing apparatus.

SUMMARY OF THE INVENTION

Viewed from a first aspect, the present invention provides a data processing apparatus, comprising: a main processor operable to execute a sequence of instructions, the main processor comprising a first pipeline having a first plurality of pipeline stages; a coprocessor operable to execute coprocessor instructions in said sequence of instructions, the coprocessor comprising a second pipeline having a second plurality of pipeline stages, and each coprocessor instruction being arranged to be routed through both the first pipeline and the second pipeline; and at least one synchronising queue coupling a predetermined pipeline stage in one of the pipelines with a partner pipeline stage in the other of the pipelines, the predetermined pipeline stage being operable to cause a token to be placed in the synchronising queue when processing a coprocessor instruction and the partner pipeline stage being operable to process that coprocessor instruction upon receipt of the token from the synchronising queue, thereby synchronising the first and second pipelines between the predetermined pipeline stage and the partner pipeline stage.

In accordance with the present invention, the data processing apparatus is provided with at least one synchronising queue coupling a predetermined pipeline stage in one of the pipelines with a partner pipeline stage in the other of the pipelines. The predetermined pipeline stage is arranged to cause a token to be placed in the synchronising queue when processing a coprocessor instruction, and the partner pipeline stage is then operable to process that coprocessor instruction upon receipt of the token from the synchronising queue, thereby synchronising the first and second pipelines at that point.

Hence, the invention provides a token-based pipeline synchronisation technique that allows some slack between the two pipelines, in that strict synchronisation at all stages is not necessary, whilst ensuring that the pipelines are correctly synchronised for crucial transfers of information. The technique of the invention can be viewed as a data-driven, loosely coupled, synchronisation scheme, in contrast to the control-driven, tightly coupled, scheme of the prior art, which involved passing signals with fixed timing between the pipelines.

Whilst it is possible that in certain embodiments there may be only a single synchronising queue, in preferred embodiments the data processing apparatus further comprises a plurality of said synchronising queues, each said synchronising queue coupling a predetermined pipeline stage in one of the pipelines with a partner pipeline stage in the other of the pipelines.

In preferred embodiments, one of the at least one synchronising queues is an instruction queue, the predetermined pipeline stage is in the first pipeline and is arranged to cause a token identifying a coprocessor instruction to be placed in the instruction queue, and the partner pipeline stage is in the second pipeline and is operable upon receipt of the token to begin processing the coprocessor instruction identified by the token.

With regard to the instruction queue, both the predetermined pipeline stage and the partner pipeline stage are preferably one of the first pipeline stages of their respective pipelines. More particular, in preferred embodiments, the predetermined pipeline stage is a fetch stage in the first pipeline and the partner pipeline stage is a decode stage in the second pipeline, that decode stage being operable to decode the coprocessor instruction upon receipt of the token.

In such preferred embodiments, the fetch stage in the first pipeline is preferably operable to cause a token to be placed in the instruction queue for each instruction in the sequence of instructions, and the decode stage in the second pipeline is arranged to decode each instruction upon receipt of the associated token in order to determine whether that instruction is a coprocessor instruction that requires further processing by the coprocessor.

As an alternative to the above approach, it will be appreciated that it would be possible to instead allow each of the instructions to first be decoded by the decode stage of the first pipeline, and to then only pass via the instruction queue instructions that were in fact coprocessor instructions to be actioned by the coprocessor. In this instance, it will be apparent that the predetermined pipeline stage would need to be either the decode stage, or a stage following the decode stage, of the first pipeline.

In preferred embodiments, one of the at least one synchronising queues is a cancel queue, the predetermined pipeline stage is in the first pipeline and is arranged to cause to be placed in the cancel queue a token identifying whether a coprocessor instruction at that predetermined pipeline stage is to be cancelled, and the partner pipeline stage is in the second pipeline and is operable upon receipt of the token from the cancel queue, and if the token identifies that the coprocessor instruction is to be cancelled, to cause that coprocessor instruction to be cancelled.

Hence, the main processor may wish to cancel an instruction that it has already passed on to the coprocessor. This may happen, for example, if the instruction fails any of its condition codes, which will require execution of the instruction to be cancelled in both the main processor and the coprocessor. The cancel queue carries this information across to the coprocessor from the main processor.

In the preferred embodiment, with regard to the cancel queue, the predetermined pipeline stage is an issue stage in the first pipeline, and the partner pipeline stage is a stage following an issue stage in the second pipeline. More particularly, in preferred embodiments, the partner pipeline stage is a first execute stage of the coprocessor pipeline.

In preferred embodiments, the partner pipeline stage is operable upon receipt of the token from the cancel queue, and if the token identifies that the coprocessor instruction is to be cancelled, to remove the coprocessor instruction from the second pipeline. It will be appreciated that there are a number of ways in which the instruction can be removed or purged from the second pipeline. For example, it may be possible to actually remove that instruction from the pipeline with immediate effect. However, in preferred embodiments, the instruction is instead allowed to pass through some of the remaining stages of the pipeline, but with a flag set to indicate that the instruction is not to be executed, so that the instruction may still pick up tokens from queues.

In preferred embodiments, one of the at least one synchronising queues is a finish queue, the predetermined pipeline stage is in the first pipeline and is arranged to cause to be placed in the finish queue a token identifying permission for a coprocessor instruction at that predetermined pipeline stage to be retired from the second pipeline, and the partner pipeline stage is in the second pipeline and is operable upon receipt of the token from the finish queue, and if the token identifies that the coprocessor instruction is permitted to be retired, to cause that coprocessor instruction to be retired.

Hence, the finish queue maintains synchronism at the end of the pipeline by providing permission for each instruction in the coprocessor pipeline to retire. In preferred embodiments, the length of the coprocessor pipeline is dictated by the need to delay the retirement of a coprocessor instruction long enough to enable receipt of the corresponding tokens emerging from the end of the finish queue.

With regard to the finish queue, the predetermined pipeline stage is preferably a write back stage in the first pipeline, and the partner pipeline stage is preferably a write back stage in the second pipeline.

In preferred embodiments, one of the at least one synchronising queues is a length queue, the predetermined pipeline stage is in the second pipeline and is arranged, for a vectored coprocessor instruction, to cause to be placed in the length queue a token identifying length information for the vectored coprocessor instruction, and the partner pipeline stage is in the first pipeline and is operable upon receipt of the token from the length queue to factor the length information into the further processing of the vectored coprocessor instruction within the first pipeline.

Some coprocessor instructions may be vectored, in that they allow several iterations of the instruction to be specified within a single instruction. Typical examples would be load and store instructions, a vectored load or a vectored store instruction allowing several data values to be transferred in a single instruction. This will typically involve the transfer of several words of data between a set of registers in the coprocessor and a contiguous set of locations in memory, or vice versa.

When the coprocessor has decoded a coprocessor instruction, it will know how long a vectored load or store operation will be, and this information is sent back to the main processor as a synchronising token via the length queue.

With regard to the length queue, in preferred embodiments the predetermined pipeline stage is a decode stage in the second pipeline, and the partner pipeline stage is a first execute stage in the first pipeline.

In preferred embodiments of the present invention, one of the at least one synchronising queues is an accept queue, the predetermined pipeline stage is in the second pipeline and is arranged to cause to be placed in the accept queue a token identifying whether a coprocessor instruction in that predetermined pipeline stage is to be accepted for execution by the coprocessor, and the partner pipeline stage is in the first pipeline and is operable upon receipt of the token from the accept queue, and if the token identifies that the coprocessor instruction is not to be accepted, to cause that coprocessor instruction to be rejected by the main processor.

The coprocessor may decide at the predetermined pipeline stage that it cannot accept an otherwise valid coprocessor instruction, and passes this information as a synchronising token via the accept queue to the main processor. If an instruction cannot be accepted by the coprocessor, it is said to have been "bounced". In preferred embodiments, if the coprocessor bounces an instruction it does not remove the instruction from its pipeline, but converts it into a "phantom" instruction which will ensure that execution of that instruction does not complete.

With regard to the accept queue, in preferred embodiments the predetermined pipeline stage is an issue stage in the second pipeline, and the partner pipeline stage is a second execute stage in the first pipeline.

Further, the partner pipeline stage is preferably operable upon receipt of the token from the accept queue, and if the token identifies that the coprocessor instruction is not to be accepted, to remove the coprocessor instruction from the first pipeline. As mentioned earlier with respect to the cancel queue, there are a number of ways in which instruction can be removed or purged from a pipeline. In preferred embodiments, the partner pipeline stage in the first pipeline is arranged upon receipt of a token from the accept queue indicating that the corresponding coprocessor instruction is not to be accepted, to allow the instruction to pass through some of the remaining stages of the first pipeline, but with a flag set to indicate that the instruction is not to be executed.

As well as the above described various control queues that may be used in preferred embodiments of the present invention, one or more synchronising queues may also be provided to act as data queues between the main processor and the coprocessor. More particularly, in preferred embodiments, one of the at least one synchronising queues is a store queue used when the coprocessor instruction is a store instruction operable to cause data items to be transferred from the coprocessor to memory accessible by the main processor, the predetermined pipeline stage is in the second pipeline and is arranged, when processing one of said store instructions, to cause to be placed in the store queue a token identifying each data item to be transferred, and the partner pipeline stage is in the first pipeline and is operable upon receipt of each token from the store queue, to cause the corresponding data item to be transferred to the memory.

In preferred embodiments, with regard to the store queue, the predetermined pipeline stage is an issue stage in the second pipeline, and the partner pipeline stage is an address generation stage in the first pipeline.

Store transfers can be a single value or a vector. In the latter case, the coprocessor converts a multiple transfer, effectively, into a series of single transfers by iterating the instruction in the issue stage of the second pipeline. This creates an instance of the store instruction for each item to be transferred. The instruction stays in the coprocessor issue stage while it iterates, creating copies of itself which move down the pipeline. The first of the iterated instructions is referred to as the "head" and the others are referred to as "tails".

In preferred embodiments, one of the at least one synchronising queues is a load queue used when the coprocessor instruction is a load instruction operable to cause data items to be transferred from memory accessible by the main processor to the coprocessor, the predetermined pipeline stage is in the first pipeline and is arranged, when processing one of said load instructions, to cause to be placed in the load queue a token identifying each data item to be transferred, and the partner pipeline stage is in the second pipeline and is operable upon receipt of each token from the load queue, to cause the corresponding data item to be transferred to the coprocessor.

In preferred embodiments, with regard to the load queue, the predetermined pipeline stage is a write back stage in the first pipeline, and the partner pipeline stage is a write back stage in the second pipeline.

As with store instructions, load instructions may specify transfers of a single data value or, via a vector load instruction, multiple data values. Hence, in preferred embodiments, load data is sent across the interface by the write back stage of the main processor and received by the write back stage of the coprocessor pipeline. In preferred embodiments, since the coprocessor pipeline cannot stall beyond the issue stage, except to wait for a finish token allowing the instruction in the write back stage to retire, the load instruction will always reach the write back stage of the coprocessor pipeline in synchronism with the arrival of the data at the coprocessor. Hence, in preferred embodiments, the load queue is simply formed by a double buffer which is used to realign the data with the arrival of the load instruction in the write back stage.

In preferred embodiments, as mentioned previously, the load instruction and store instruction may be vectored coprocessor instructions defining multiple data items to be transferred, and the apparatus further comprises flow control logic, associated with at least one of the load queue and the store queue, operable to send a control signal to the predetermined pipeline stage to stop issuance of tokens by the predetermined pipeline stage whilst it is determined that the associated load or store queue may become full.

The flow control logic allows the flow of data to be halted if the receiving pipeline is unable to process the data. In preferred embodiments, the flow control logic is provided for the store queue, the flow control logic being operable to issue the control signal upon receiving an indication from the main processor that the partner pipeline stage cannot accept a data item. Given the earlier mentioned fact that in preferred embodiments the load instruction will always reach the write back stage of the coprocessor pipeline in synchronism with the arrival of the data at the coprocessor via the load queue, there is no need in preferred embodiments for flow control logic associated with the load queue. However, it will be appreciated that in implementations where such synchronism cannot be guaranteed, then flow control logic could also be provided with the load queue if required.

In preferred embodiments, the store data requires flow control to allow the load store unit of the main processor to halt the flow of data from the coprocessor. This is done by sending a stop signal to the coprocessor. As this signal in preferred embodiments takes two clock cycles to reach the coprocessor, it is preferably generated as soon as there is a risk of the store queue becoming full. With a relatively short queue, this risk becomes real as soon as the load store unit of the main processor cannot accept a data item, and hence in preferred embodiments the stop signal is sent to the coprocessor whenever the load store unit of the main processor cannot accept data.

It is sometimes necessary for the main processor to be able to identify instructions in the coprocessor pipeline. This is, for example, necessary for flushing so that the main processor can indicate to the coprocessor which instructions are to be flushed. The main processor therefore gives each instruction sent to the coprocessor a tag, which in preferred embodiments is drawn from a pool of values large enough so that all of the tags in the pipeline at any moment in time are unique.

Hence, in preferred embodiments, each token includes a tag which identifies the coprocessor instruction to which the token relates.

Accordingly, in preferred embodiments, the main processor is operable, when it is necessary to flush coprocessor instructions from both the first and the second pipeline, to broadcast a flush signal to the coprocessor identifying the tag relating to the oldest instruction that needs to be flushed, the coprocessor being operable to identify that oldest instruction from the tag and to flush from the second pipeline that oldest instruction and any later instructions within the coprocessor.

Furthermore, in preferred embodiments, one or more of said at least one synchronising queues are flushed in response to said flush signal, with the tag being used to identify which tokens within the queue are to be flushed.

In preferred embodiments, the flushing mechanism is simplified if successive coprocessor instructions have contiguous tags. This is achieved in preferred embodiments by only incrementing the tag number when the instruction passed to the coprocessor is a coprocessor instruction. This is done after sending the instruction, and so the tag changes after a coprocessor instruction is sent, rather than before. In preferred embodiments, it is not possible to increment the tag before sending the instruction as the main processor has not yet had time to decode the instruction to determine what kind of instruction it is. When the coprocessor decode stage removes the non-coprocessor instructions, it is left with an instruction stream carrying contiguous tags.

It will be appreciated that the synchronising queues can take a variety of forms. However, in preferred embodiments, each synchronising queue comprises a First-In-First-Out (FIFO) buffer having a predetermined number of entries for storing tokens. In preferred embodiments, each of the queues other than the load queue has three entries or slots for storing tokens. As mentioned earlier, the load queue of preferred embodiments is preferably provided by a double buffer.

In certain embodiments, a plurality of coprocessors may be provided, with each synchronising queue coupling a pipeline stage in the main processor with a pipeline stage in the one of the coprocessors. For reasons of economy, in preferred embodiments it is ensured that as little of the coprocessor interface is duplicated as possible. In particular, the coprocessors in preferred embodiments would share the length, accept and store data queues, which are maintained by the main processor. If these queues are shared, only one coprocessor may use the queues at any time, which is most readily guaranteed by allowing only one coprocessor to be active at any time. This however is not generally a significant limitation, since generally speaking only one coprocessor will be in use at any time. More specifically, a processor is typically driven through driver software, which will drive just one coprocessor. Calls to the driver software and returns from it will generally ensure that there are several core instructions between the use of one coprocessor and the use of a different coprocessor.

It will be appreciated that the token-based pipeline synchronisation technique of the present invention could be applicable to both asynchronous and synchronous designs of data processing apparatus. However, in preferred embodiments the data processing apparatus has a synchronous design, such that the tokens are caused to be placed in the queue by the predetermined pipeline stage and are caused to be received from the queue by the partner pipeline stage upon changing edges of a clock cycle.

Viewed from a second aspect, the present invention provides a method of synchronisation between pipelines in a data processing apparatus, the data processing apparatus comprising a main processor operable to execute a sequence of instructions and a coprocessor operable to execute coprocessor instructions in said sequence of instructions, the main processor comprising a first pipeline having a first plurality of pipeline stages, and the coprocessor comprising a second pipeline having a second plurality of pipeline stages, and each coprocessor instruction being arranged to be routed through both the first pipeline and the second pipeline, the method comprising the steps of: (a) coupling a predetermined pipeline stage in one of the pipelines with a partner pipeline stage in the other of the pipelines via a synchronising queue; (b) placing a token in the synchronising queue when the predetermined pipeline stage is processing a coprocessor instruction; (c) upon receipt of the token from the synchronising queue by the partner pipeline stage, processing the coprocessor instruction within the partner pipeline stage; whereby synchronisation of the first and second pipelines between the predetermined pipeline stage and the partner pipeline stage is obtained.

BRIEF DESCRIPTION OF THE DRAWINGS

The present invention will be described, further by way of example only, with reference to a preferred embodiment thereof as illustrated in the accompanying drawings, in which:

FIG. 12 is a diagram illustrating how the core and coprocessor pipelines behave when a coprocessor instruction is cancelled by the core in its issue stage in accordance with one embodiment of the present invention;

DESCRIPTION OF PREFERRED EMBODIMENTS

Figure 1:
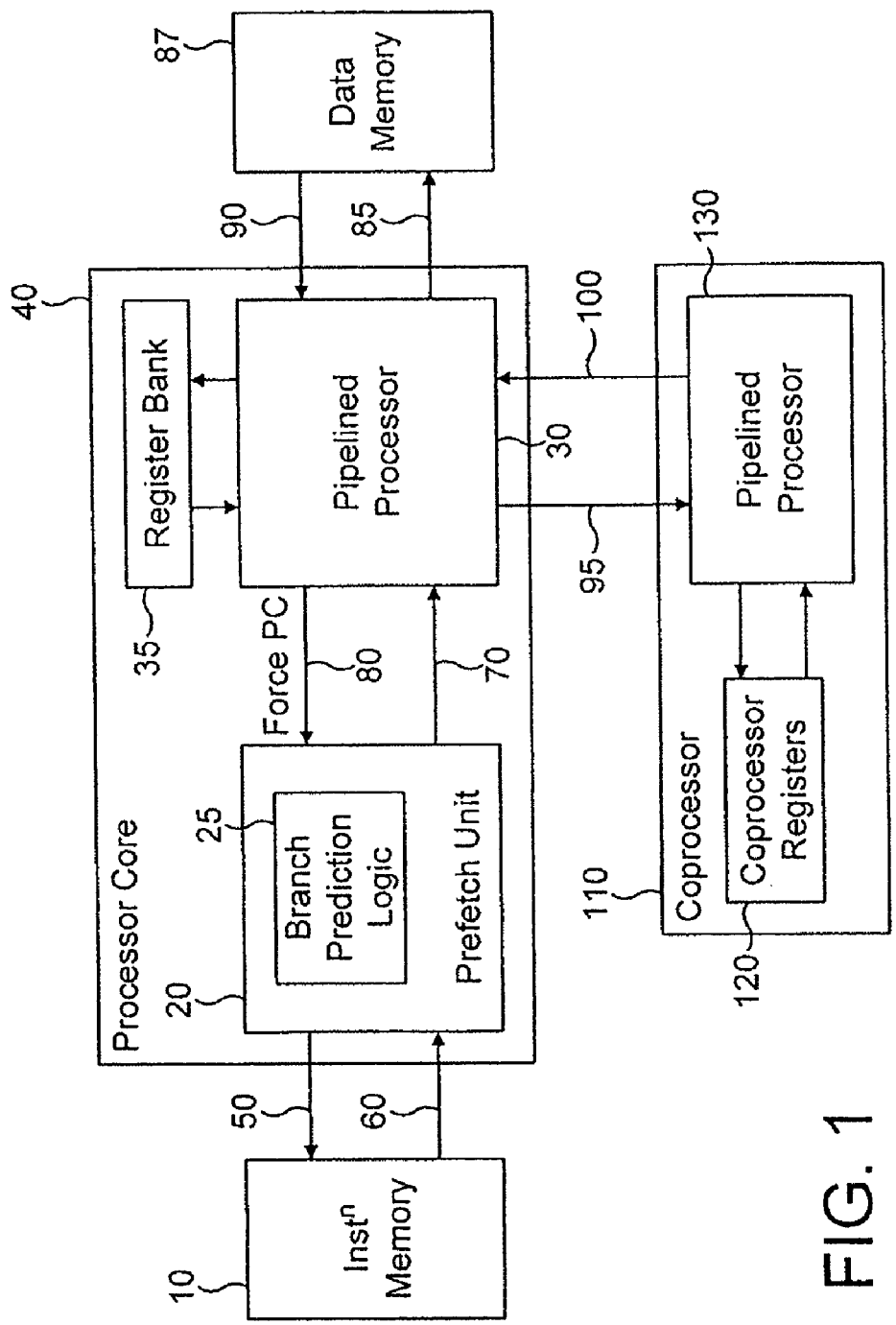
FIG. 1 is a block diagram of a system in which the synchronisation techniques of preferred embodiments of the present invention may be implemented.

FIG. 1 is a block diagram illustrating a data processing system in which the synchronisation techniques of preferred embodiments of the present invention may be employed. As shown in FIG. 1, a processor core 40 is coupled to an instruction cache or other memory device 10 from which instructions required by the processor core 40 may be accessed. Within the processor core 40, a prefetch unit 20 is provided for issuing over path 50 requests for instructions determined by the prefetch unit to be required by the pipelined processor 30. The instruction memory 10 from which the instructions are retrieved then outputs the instructions back to the prefetch unit 20 over path 60, from where they are then passed over path 70 into the pipelined processor 30. When executing instructions, the pipelined processor 30 will interface with registers of register bank 35 containing data values to be manipulated by the instructions. Via paths 85 and 90, load instructions may be used to load data values into the register bank from the data memory 87, and store instructions may be used to store data values into the data memory 87 from the register bank 35. Data processing instructions may then be executed on the data values stored in particular registers of the register bank 35.

Some instructions in the instruction sequence prefetched by the prefetch unit may be branch instructions which are arranged to cause a change in instruction flow. Some branch instructions specify the target address for the branch within the opcode of the instruction itself, and hence some prediction of these branch instructions can be performed in order to assist the prefetch unit 20 in deciding which instruction to prefetch following such a branch instruction. Such branch prediction is performed by the branch prediction logic 25. If the branch prediction logic 25 predicts that such a branch instruction will be executed, and that hence the branch will be taken, the prefetch unit 20 will be arranged to retrieve as the next instruction the instruction specified by the target address. Conversely, if the branch prediction logic 25 predicts that the branch instruction will not be executed, and that accordingly the branch will not be taken, the prefetch unit 20 will retrieve as the next instruction the instruction at the next sequential address in the instruction memory 10.

Clearly it is important that when within the pipelined processor 30 it is ultimately decided whether to execute any such branch instructions, that the relevant information is passed back to the prefetch unit 20 if the prefetch unit 20 is required to take any action. For example, for predictable branch instructions, it is necessary to inform the prefetch unit 20 if the prediction made was wrong. For example, if the branch prediction logic 25 predicted that the branch was taken, and hence retrieved the instruction at the target address, but when the instruction is subsequently executed by the pipelined processor 30, it is determined that that branch instruction should in fact not be executed, then a recovery address needs to be output as the force PC signal over path 80, in this event the recovery address being the next sequential address following that branch instruction. Similarly, if the branch prediction logic 25 had predicted the branch instruction as not being executed, but in fact the pipelined processor 30 subsequently determines that it should be executed, then a recovery address again needs to be issued over path 80 to the prefetch unit 20, in this event the recovery address being the target address for the branch. Otherwise, in the event that the branch prediction was correct, no further action is required, and no force PC signal needs to be issued to the prefetch unit 20 over path 80.

One reason why branch instructions may not in fact be executed is because branch instructions are often specified as conditional instructions which are only executed if a certain condition exists at the time of execution. These various conditions are specified with reference to a set of condition codes, and hence will specify that one or more of the condition codes must have a particular value if the instruction is to be executed. Whilst it is possible to make certain predictions about the status of the condition codes, and accordingly make a prediction as to whether a branch instruction will be executed, it is only when that branch instruction reaches a predetermined point within the pipelined processor 30 that absolute evaluation of the condition codes can take place, since condition codes are updateable by condition code setting instructions in the instruction sequence, and hence the status of the condition codes will vary over time.

Certain instructions within the instruction sequence may also be coprocessor instructions, which are to be executed within the pipelined processor 130 of the coprocessor 110. Such coprocessor instructions are issued over path 95 to the pipelined processor 130 of coprocessor 110. The pipelined processor 130 will then execute the coprocessor instruction, referencing the coprocessor registers 120 as required, and if the results of the coprocessor instruction need to be returned to the core 40, they will then be returned over path 100.

Although the coprocessor instruction is passed to the coprocessor over path 95, it is also passed through the various pipeline stages of the pipelined processor 30 of the core 40, for example to enable a determination to be made as to whether that coprocessor instruction should in fact be executed if that coprocessor instruction is a conditional coprocessor instruction dependent on the status of the condition codes at the time of execution. Control signals are passed between the pipelined processor 30 and the pipelined processor 130 via predetermined queues to ensure that the progress of a coprocessor instruction through both pipelines remains in synchronisation at required points. This process will be discussed in more detail later.

Figure 2:
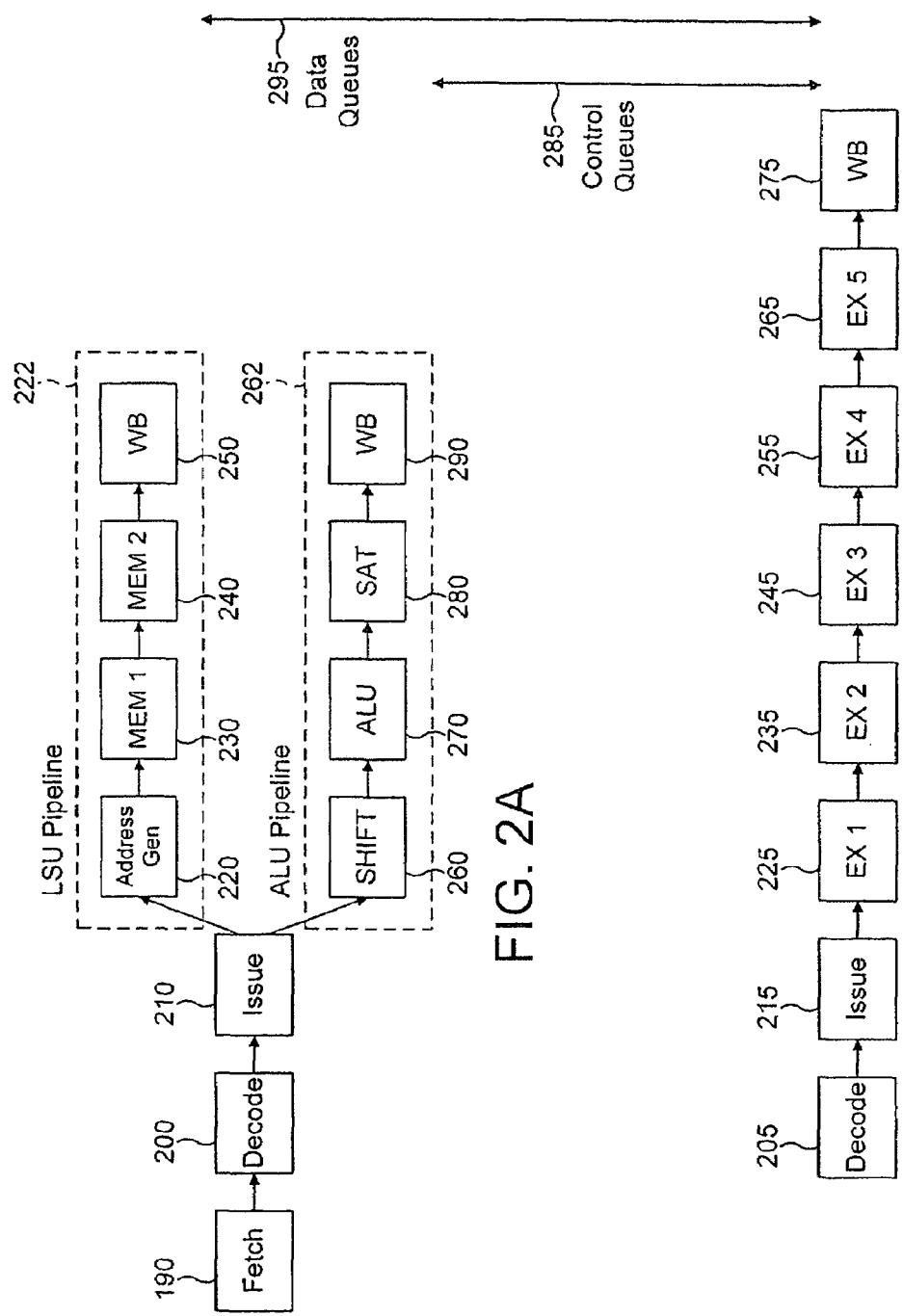
FIG. 2A is a diagram schematically illustrating a pipelined processor in accordance with preferred embodiments of the present invention.
FIG. 2B is a diagram schematically illustrating a pipelined coprocessor in accordance with preferred embodiments of the present invention.

FIG. 2A is a block diagram illustrating the various pipeline stages of the pipeline provided within the pipelined processor 30 of FIG. 1 in accordance with preferred embodiments of the present invention. At stage 190, an instruction is fetched from the prefetch unit 20, after which it is decoded at the decode stage 200, and then subsequently passed on to the issue stage 210, where the data required by the instruction is obtained from appropriate registers of the register bank 35.

At this point, the processor branches into two subsidiary pipelines, the first subsidiary pipeline containing pipeline stages 220, 230, 240 and 250, and the second subsidiary pipeline containing pipeline stages 260, 270, 280 and 290. The first subsidiary pipeline is a load/store pipeline 222, also referred to herein as a load/store unit (LSU). The load/store pipeline is used to process load or store instructions, and accordingly a load or store instruction will be routed from pipeline stage 210 into pipeline stage 220. The process performed at pipeline stage 220 is to generate the address required for the memory access to be used to effect the load or store operation. This process will typically involve adding the values of two registers together, or adding the value of a register to an "immediate" value specified within the instruction, etc. Stages 230 and 240 are two memory pipeline stages, during which the memory access required by the load or store instruction takes place. In preferred embodiments of the invention illustrated in FIG. 2A, there are two memory stages 230, 240 since load and store operations will in such embodiments typically take at least two clock cycles.

When the memory access has completed, the instruction will move from the memory 2 pipeline stage 240 into the write back stage 250, also referred to herein as a retirement stage. In the write back stage, the register bank 35 is prepared for updating to reflect the result of the load or store operation, that update taking place at the end of the write back stage.

Any arithmetic logic instructions, such as add or subtract instructions, will be routed from the pipeline stage 210 into the pipeline stage 260 of the second subsidiary pipeline 262 (also referred to herein as the ALU pipeline), this stage providing shift logic to enable any required shifting of the operands to be performed. The instruction is then routed into the pipeline stage 270, which incorporates an arithmetic logic unit for executing that arithmetic logic instruction. After this execution stage, the instruction is passed to the saturation stage 280 of the pipeline, where any required saturation of the result is performed. For example, some arithmetic logic instructions require that the result is saturated to a predetermined number of bits, and hence as an example may require a 16 bit result to be saturated to a 9 bit result. Such a process is performed within the pipeline stage 280. After any required saturation, the instruction is then passed to the write back stage 290, also referred to herein as a retirement stage. As described earlier with reference to the write back stage 250, the purpose of the write back stage is to update the state of the data processing apparatus, and in particular to update the register bank 35, having regard to the result of execution of the instruction in the write back stage.

FIG. 2B illustrates the various pipeline stages of the pipeline provided within the pipelined processor 130 of the coprocessor 110 of FIG. 1 in accordance with preferred embodiments of the present invention. The first two stages are a decode stage 205 and an issue stage 215. The instruction then passes through five execution stages 225, 235, 245, 255 and 265, after which the instruction enters a write back stage 275 where the coprocessor registers 120 are updated having regard to the result of execution of the coprocessor instruction in the write back stage.

As will be discussed in more detail with reference to the remaining diagrams, various queues are provided between particular pipeline stages of the processor core and the coprocessor to enable synchronisation to take place between the pipeline stages coupled by each queue using a token-based scheme. More particularly, one or more control queues 285 may be provided between the ALU pipeline 262 and the coprocessor pipeline, and in addition one or more data queues 295 may be provided between the LSU pipeline 222 of the core and the coprocessor pipeline.

A description of the token-based pipeline synchronisation technique used in preferred embodiments of the present invention to ensure that the pipelines are correctly synchronised for crucial transfers of information will now be provided with reference to FIGS. 3 to 19. In the following description, the main processor will be referred to as the core, and the coprocessor will also be referred to as the "GCP", or generic coprocessor. The description of FIGS. 3 to 19 will be provided with reference to the following numbered paragraphs.

1 Introduction

The core may need to pass instructions to a number of coprocessors and exchange data with them. These coprocessors are intended to run more or less in step with the core and are pipelined in a similar way to the core. Instructions are passed out of the fetch stage of the core pipeline to be decoded by the coprocessor which then passes the decoded instruction down its own pipeline. Coprocessor instructions may be cancelled by the core, if a condition code fails, or the entire coprocessor pipeline flushed in the event of a mispredicted branch. Load and store data also need to pass between the core LSU and the coprocessor pipeline.

A major constraint imposed upon the coprocessor interface is that it must operate over a two cycle delay, that is, any signal passing from the core to the coprocessor, or vice-versa, must be given a whole clock cycle to propagate from one to the other. This means that a signal crossing the interface must be clocked out of a register on one side of the interface and clocked directly into another register on the other side; no combinatorial process must intervene. This constraint arises because the core and coprocessor may be placed a considerable distance apart and generous timing margins must be allowed for to cover signal propagation times. This delay in signal propagation makes it difficult to maintain pipeline synchronisation, ruling out a tightly coupled synchronisation method.

The following description describes a token-based pipeline synchronisation method that allows some slack between the two pipelines, while ensuring that the pipelines are correctly aligned for crucial transfers of information.

2 Description

The GCP interface achieves loose synchronisation between the two pipelines by exchanging tokens from one pipeline to the other. These tokens pass down queues between the pipelines and may carry additional information. In many cases, the primary purpose of the queue is to carry information about the instruction being processed or to inform one pipeline of events occurring in the other. Tokens are generated whenever a coprocessor instruction passes out of a relevant pipeline stage into the next stage. These tokens are picked up by the partner stage in the other pipeline and used to permit the corresponding instruction in that stage to move on. The movement of coprocessor instructions down each pipeline is matched exactly by the movement of tokens along the various queues that connect the pipelines. The generic coprocessor interface is thus data-driven, rather than control-driven.

2.1 Coprocessor Instructions

The GCP may need to execute a number of instructions taken from a set of instructions specific to coprocessors. A given coprocessor may not necessarily execute all the possible coprocessor instructions, and may reject those instructions it cannot handle. Table 1 below lists all the coprocessor instructions supported by one particular processor core, namely one of the ARM processor cores developed by ARM Limited of Cambridge, United Kingdom, and gives a brief description of each.

TABLE 1

Coprocessor Instructions

| Instruction | Data Transfer | Vectored | Description |
|---|---|---|---|
| CDP | None | No | Processes information already held within the coprocessor |
| MRC | Store | No | Transfers information from the coprocessor to the core registers |
| MCR | Load | No | Transfers information from the core registers to the coprocessor |
| MRRC | Store | No | Transfers information from the coprocessor to a pair of registers in the core |
| MCRR | Load | No | Transfers information from a pair of registers in the core to the coprocessor |
| STC | Store | Yes | Transfers information from the coprocessor to memory - may be iterated to transfer a vector |
| LDC | Load | Yes | Transfers information from memory to the coprocessor - may be iterated to transfer a vector |

The coprocessor instructions fall into three main groups; loads, stores and processing instructions. The load and store instructions allow information to pass between the core and the coprocessor. Some of them may be vectored, that is, they allow several values to be transferred in a single instruction. This will typically involve the transfer of several words of data between a set of registers in the coprocessor and a contiguous set of locations in memory. Other instructions, for instance MCR and MRC, allow the transfer of data between core and coprocessor registers. The CDP instruction controls the execution of a specified operation on data already held within the coprocessor, writing the result back into a coprocessor register, or changing the state of the coprocessor in some other way. Which operation is to be carried out may be specified by opcode fields within the instruction.

The core pipeline handles all instructions, both core and coprocessor instructions. The coprocessor, on the other hand, only deals with coprocessor instructions, so the coprocessor pipeline is likely to be empty for a significant proportion of the time.

2.2 Coprocessor Pipeline

The GCP pipeline is very similar to the core pipeline, but lacks the fetch stages. Instructions are instead passed from the core into the decode stage of the GCP pipeline. The decode stage then decodes the instruction, rejecting non-coprocessor instructions and any coprocessor instructions containing a non-matching coprocessor number. The length of any vectored data transfer is also decided at this point and sent back to the core. The decoded instruction then passes into the issue stage. This stage decides whether this particular instance of the instruction may be accepted. If it cannot, perhaps because it addresses a non-existent register, the instruction is bounced, telling the core that it cannot be accepted. If the instruction is both valid and executable it then passes down the execution pipeline, EX1 to EX6. At the bottom of the pipeline, in EX6 (also referred to herein as the write back (WB) stage), the instruction waits for retirement, which it can do when it receives a matching token from another queue fed by the core.

2.3 Token Based Pipeline Synchronisation

Figure 3:
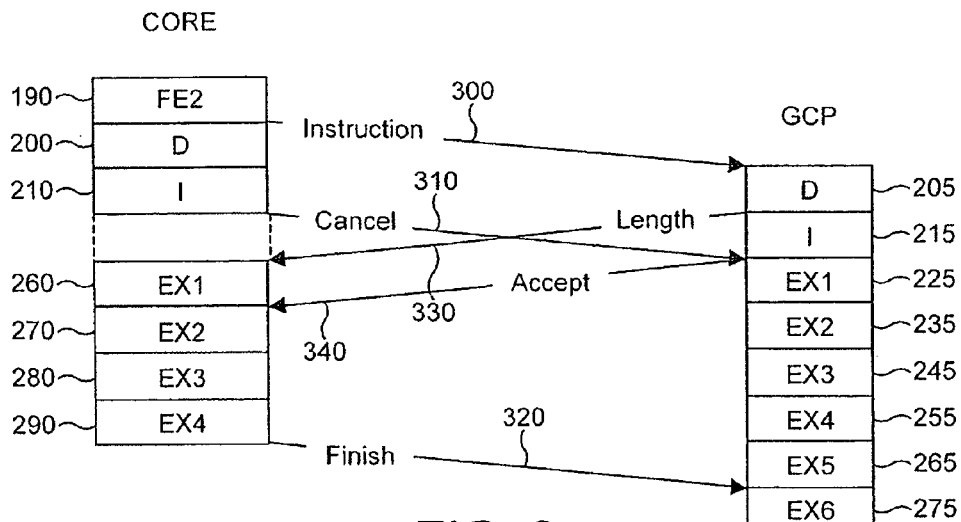
FIG. 3 is a diagram schematically illustrating the pipeline stages of the processor core, the pipeline stages of the coprocessor, and the synchronising control queues that communication between them in accordance with the preferred embodiments of the present invention.

FIG. 3 shows the core and GCP pipelines and the synchronising queues that communicate between them. Each queue is implemented as a very short First-In First-Out (FIFO) buffer. No explicit flow control is required for the queues, as the pipeline lengths between the queues limits the number of items any queue can hold at any time. The geometry shown requires no more than three slots to be available in each queue. The only status information required is a flag to indicate when the queue is empty. This needs only to be monitored by the receiving end of the queue, and determines whether the associated pipeline stage can move on. Any information carried by the queue can also be read and acted upon at the same time.

The operation of the pipeline synchronisation will be described by describing the purpose of each of the queues.

2.3.1 Instruction Queue

The core passes every instruction leaving its fetch stage 190 down the instruction queue 300. Ideally it should only pass on the coprocessor instructions, but has not, at this stage, had time to decode the instruction. It is left to the GCP to decode the instruction on arrival in its own decode stage 205 and reject the non-coprocessor instructions. It can do this silently as the core needs no acknowledgement of the removal of these instructions, because it will have decided in its decode stage 200 the type of each instruction. The instruction queue 300 is three slots long.

2.3.2 Cancel Queue

The core may wish to cancel an instruction that it has already passed on to the coprocessor. This may happen if the instruction fails its condition codes, which will require the instruction to be removed from the instruction stream in both the core and the coprocessor. The cancel queue 310 carries this information across to the coprocessor; it is three slots long.

2.3.3 Finish Queue

The finish queue 320, which is three slots long, maintains synchronism at the end of the pipeline by providing permission for each instruction in the coprocessor pipeline to retire. The length of the coprocessor pipeline is dictated by the need to delay the retirement of a coprocessor instruction long enough to meet tokens emerging from the end of the finish queue 320. Load and store instructions make no use of the finish queue, so only CDP instructions need this queue. How load and store instructions retire will be discussed in a later section.

2.3.4 Length Queue

When a coprocessor has decoded an instruction it will know how long a vectored load or store operation will be. This information is sent with the synchronising token down the length queue 330. In the general case it takes longer to receive an instruction, decode it and return the length, than to pass the instruction down the core pipeline from the fetch stage 190 to the EX1 stage 260 (also referred to herein as the shift stage), where the information is needed. The delay in the arrival of the token at the core EX1 stage causes that stage to stall for one cycle. This adds an extra cycle into the execution of a coprocessor instruction. Fortunately this penalty is not incurred for every coprocessor instruction, and the reasons for this are explored in a later section. The length queue is three slots long.

2.3.5 Accept Queue

The coprocessor may decide in the issue stage that it cannot accept an instruction, and passes this information with the synchronising token down the accept queue 340. When the core EX2 stage 270 (also referred to herein as the ALU stage) receives a token telling it to reject the corresponding instruction, it removes the instruction from the pipeline by clearing the EX2 stage. The accept queue is three slots long, 2.3.6 Flush Broadcast If a branch has been mis-predicted it may be necessary for the core to flush both pipelines. As this action potentially affects the entire pipeline, it is not passed across in a queue, but is broadcast from the core to the coprocessor, subject to the same timing constraints as the queues. The flush signal, when received by the coprocessor will cause the pipeline and the instruction queue 300 to be cleared up to the instruction triggering the flush.

Figure 4:
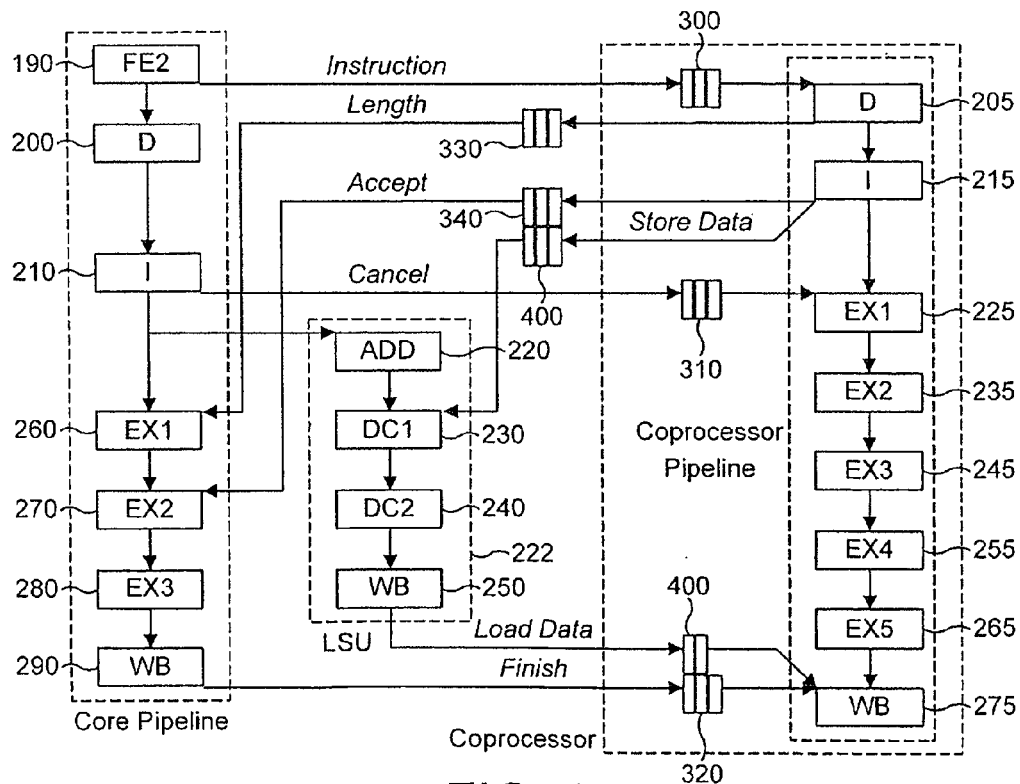
FIG. 4 is a more detailed block diagram illustrating the various pipelines and the queues that connect them.

FIG. 4 shows a more detailed view of the core and pipeline stages and the queues that connect the two. The core's load/store unit (LSU) 222 is also shown. The LSU accepts store data from the coprocessor via a store queue 400 and generates load data to send to the coprocessor via a load queue 410.

The instruction queue 300 and the coprocessor decode stage 205 are shown separately, but in fact they form a single block in preferred embodiments. The reason for this is explained in section 2.5.4.

2.4 Data Transfer

Most coprocessor instructions result in the transfer of data across the interface, either as single values or vectors. Paths are therefore required for data passing. These paths allow the core LSU 222 to communicate with the coprocessor pipeline. The coprocessor will not generally have a separate LSU and so the generation of data for stores and the reception of load data will carried out directly by the pipeline.

Figure 5:
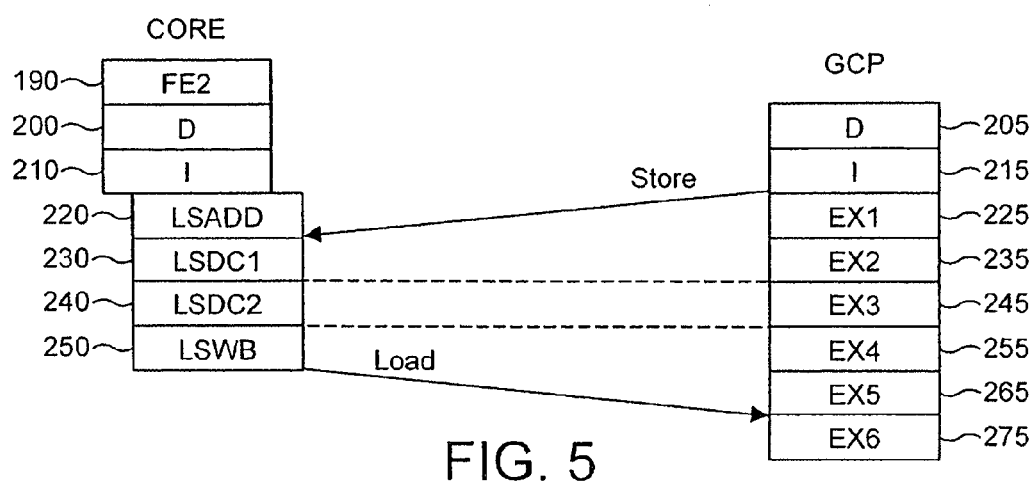
FIG. 5 is a diagram schematically illustrating the communication between the load store unit of the main processor and the coprocessor pipeline for load and store operations.

FIG. 5 shows an outline view of the communication between the core LSU 222 and the coprocessor pipeline.

Loads and stores will be described separately in the following sections.

2.4.1 Loads

Load data are sent across the interface by the WB stage 250 of the core LSU 222 and received by the EX6 stage 275 (i.e. the WB stage) of the coprocessor pipeline, as shown in FIG. 5. As the coprocessor pipeline cannot stall beyond the issue stage, except to wait for a finish token allowing the instruction in EX6 to retire, the load instruction will always reach EX6 in synchronism with the arrival of the data at the coprocessor. The load queue can hence be implemented by a double buffer 410, which serves to realign the data with the arrival of the load instruction in EX6. This double buffer 410 is shown in FIG. 4.

2.4.2 Stores

As the core LSU may not be able to guarantee to accept data as they arrive, a store queue 400 is required. This queue connects the DC1 stage 230 (also referred to herein as the memory 1 stage) of the LSU 222 to the issue stage 215 of the coprocessor. As varying amounts of data may be transferred, flow control is required on the store queue 400 to allow the LSU 222 to stop temporarily the transfer of data. This will be discussed in more detail later.

2.5 Token Queue Management

The token queues (i.e. all of the queues other than the load queue 410), all of which are three slots long and function identically, are implemented as short FIFOs. Most of the queues require no flow control, owing to the self-limiting nature of the synchronised pipelines, but the store data queue 400 does need to be able to control the flow of information into it from the coprocessor. The form of the queues, and the addition of flow control, are discussed in the following sections.

2.5.1 Queue Implementation

Figure 6:
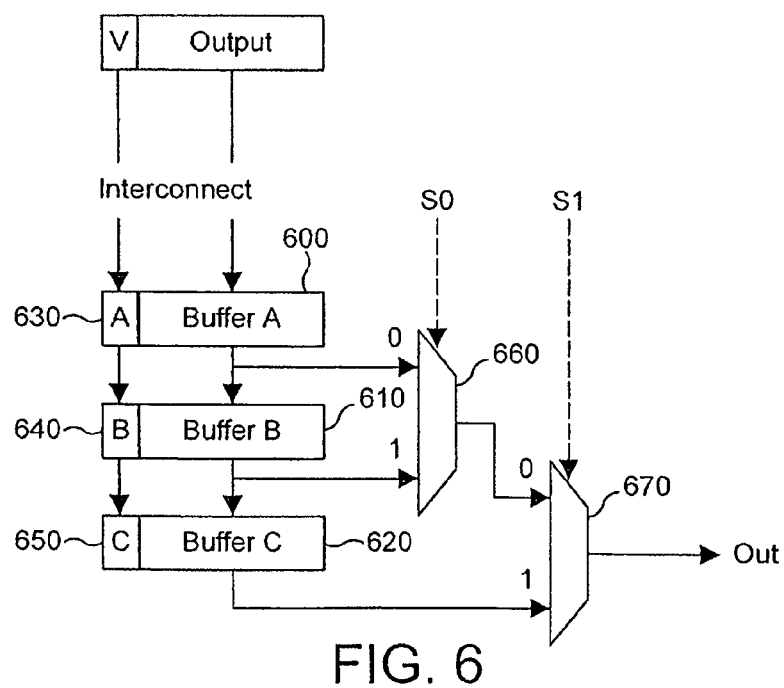
FIG. 6 is a diagram illustrating the construction of the queues in accordance with preferred embodiments of the present invention.

The queue FIFOs may be implemented as three registers 600, 610, 620, with the current output selected by using multiplexors 660, 670. FIG. 6 illustrates this arrangement. The queue consists of three registers 600, 610, 620, each of which is associated with a flag 630, 640, 650, respectively, indicating whether the register contains valid data. New data are moved into the queue by being written into buffer A, i.e. register 600, and continue to move along the queue as long as the next register is empty, or is about to become empty. If the queue is full the oldest data, and therefore the first to be read from the queue, will occupy buffer C and the newest will occupy buffer A.

The multiplexors 660, 670 also select the current flag, which then indicates whether the selected output is valid.

2.5.2 Queue Modification

The queue is written to on each cycle, buffer A 600 accepting the data arriving across the interface and the buffer A flag 630 accepting the valid bit associated with the data. As long as the queue is not full this will result in no loss of data as the contents of buffer A will be moved to buffer B 610 during the same cycle. If the queue is full, then the loading of buffer A 600 is inhibited to prevent loss of data. In any case, as mentioned earlier, the geometry of the pipelines shown in FIGS. 3 and 4 requires no more than three slots to be available in each queue, and so no valid data should be presented by the interface when the queue is full, so no data loss should ensue. The state of the three buffer flags 630, 640, 650 is used to decide which buffer provides the queue output during each cycle. The output will always be provided by the buffer containing the oldest data. This will be buffer C, if it is full, or buffer B or, if that is empty, buffer A. A simple priority encoder, looking at the three flags, can supply the correct multiplexor select signals. The state of the three flags can also determine how data are moved from one buffer to another in the queue. Table 2 shows how the three flags may be decoded ("X" indicates a "don't care" state).

TABLE 2

Addressing of Queue Buffers

| Flag C | Flag B | Flag A | S1 | S0 | Remarks |
|--------|--------|--------|----|----|---------|
| 0 | 0 | 0 | X | X | Queue is empty |
| 0 | 0 | 1 | 0 | 0 | B ← A |
| 0 | 1 | 0 | 0 | 1 | C ← B |
| 0 | 1 | 1 | 0 | 1 | C ← B, B ← A |
| 1 | 0 | 0 | 1 | X | |
| 1 | 0 | 1 | 1 | X | B ← A |
| 1 | 1 | 0 | 1 | X | |
| 1 | 1 | 1 | 1 | X | Queue is full - input inhibited |

It should be noted that new data can be moved into buffer A, provided the queue is not full, even if its flag is set, as the current contents of buffer A will be moved to buffer B.

Figure 7:
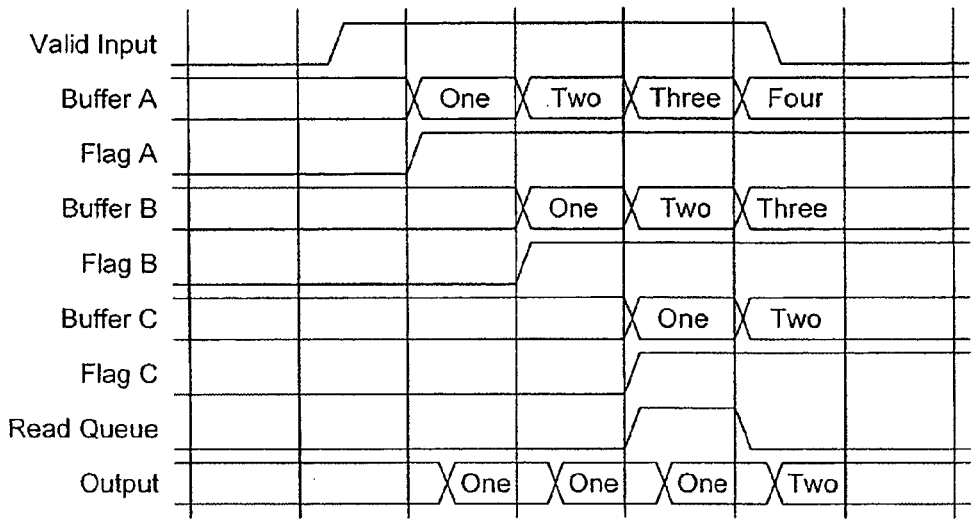
FIG. 7 is a timing diagram illustrating reading and writing of a queue.

When the queue is read, the flag associated with the buffer providing the information must be cleared. This operation may be combined with an input operation so that the buffer is overwritten at the end of the cycle during which it provides the queue output. This may be implemented by using the read enable signal to mask the flag of the selected stage, making it available for input. FIG. 7 provides an illustration of reading and writing a queue.

Four valid inputs ("One", "Two", "Three" and "Four") are written into the queue, and are clocked into buffer A 600 as they arrive. The figure shows how these inputs are clocked from buffer to buffer until the first input reaches buffer C 620. At this point a read from the queue is required. As buffer C is full, it is chosen to supply the data. As it is being read, it is free to accept more input, and so it receives the value "Two" from buffer B, which receives the value "Three" from buffer A. Because buffer A is being freed by writing to buffer B, it can accept the value "Four" from the input.

2.5.3 Flow Control

Figure 8:
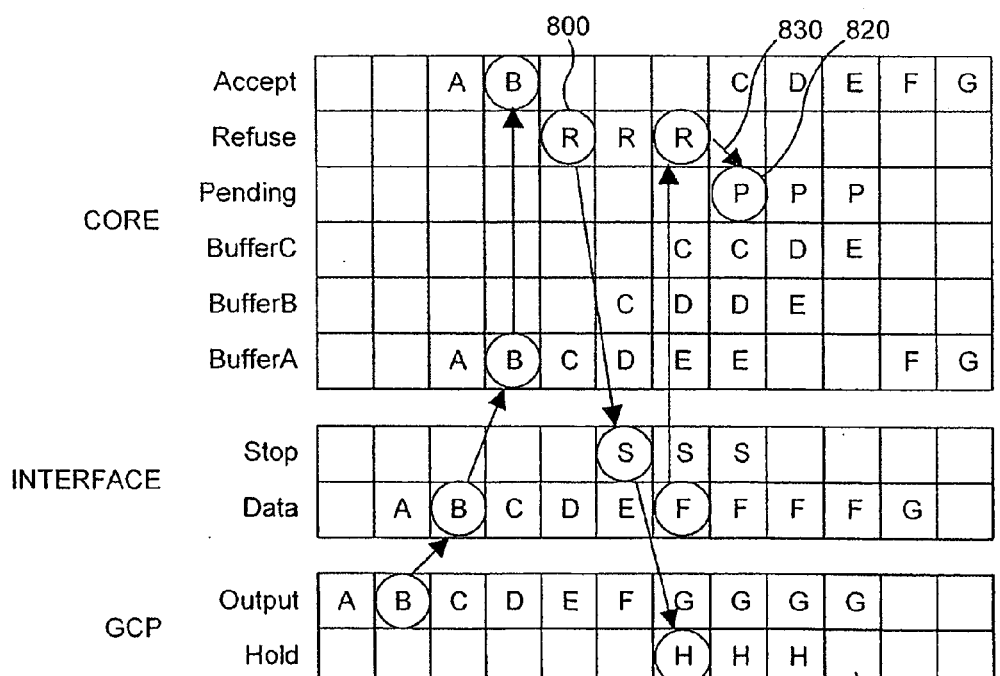
FIG. 8 is a diagram illustrating the concept of flow control as used in preferred embodiments of the present invention.

As indicated previously, the store data requires flow control to allow the core LSU 222 to halt the flow of data from the coprocessor. This is done by sending a stop signal to the coprocessor. As this signal takes two clock cycles to reach the coprocessor, it must be generated as soon as there is a risk of the store queue 400 becoming full. With a queue length of three this risk becomes real as soon as the core LSU cannot accept a data item. The stop signal is thus sent to the coprocessor whenever the LSU cannot accept data. Because of the delay the coprocessor continues to send data for two more cycles after the stop signal is raised. If there is also an item "in flight" when the stop signal is sent, the queue will have to accept three items after sending it. FIG. 8 illustrates this situation.

The LSU accepts the first two transfers, A and B. It is unable, however, to accept the third item, C, and raises the Stop signal at point 800. By the time this signal reaches the coprocessor at point 810, it has sent three more items, C, D and E, and has already placed a sixth item, F, onto the interface. Having now received the Stop signal, the coprocessor leaves item F on the interface. Seeing this new item and being unable to accept it, the LSU 222 sets a Pending flag at point 820 to record its presence. When the LSU is able to accept more data it starts to unload the queue and deasserts the Stop signal at point 830. By the time this deassertion reaches the coprocessor at point 840, the queue is emptying and normal service can be resumed.

2.5.4 Instruction Decode

Figure 9:
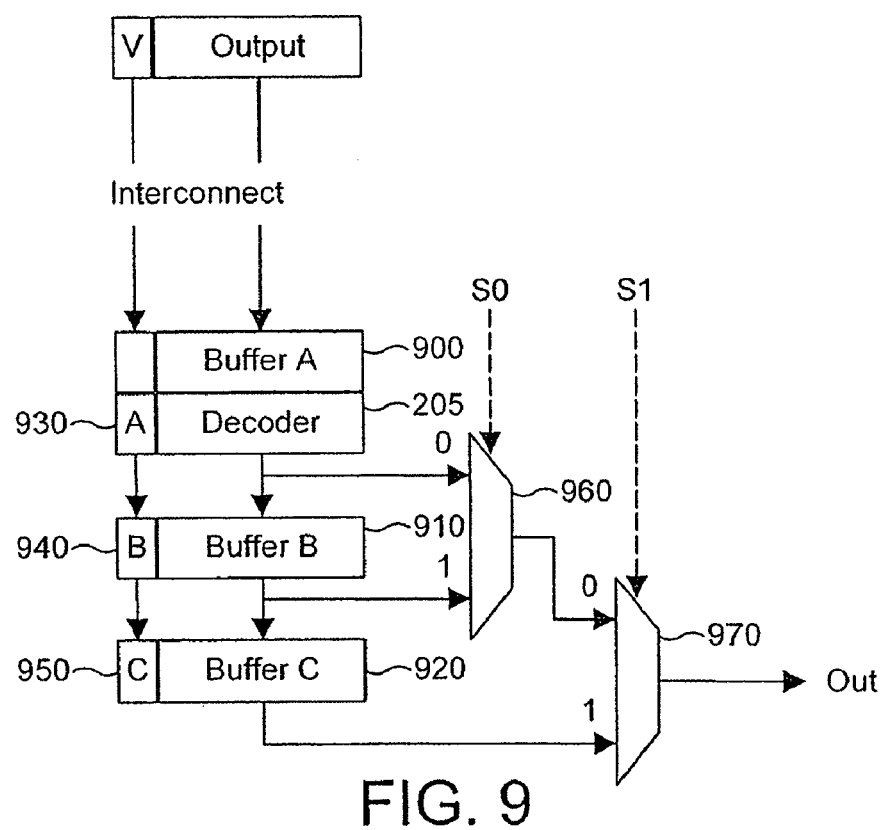
FIG. 9 is a diagram illustrating how the instruction queue is implemented in a preferred embodiment of the present invention.

The core passes every instruction fetched from memory across the GCP interface, where it enters the instruction queue 300. Ideally it should only pass on the coprocessor instructions but has not, at this stage, had time to decode the instruction. It is left to the GCP to decode the instruction on arrival in its own decode stage 205 and reject the non-coprocessor instructions. It can do this silently as the core needs no acknowledgement of the removal of these instructions, because it will by then have decided in its own decode stage 200 the type of each instruction. This means that the instruction received from the core must be decoded as soon as it enters the instruction queue. The instruction queue 300, therefore, is a modified version of the standard queue, which incorporates an instruction decoder 205. FIG. 9 shows how the instruction queue may be implemented.

The decoder 205 decodes the instruction written into buffer A 900 as soon as it arrives and the subsequent buffers, B 910 and C 920, receive the decoded version of the instruction in buffer A. The A flag 930 now indicates that the data in A are valid and also represent a coprocessor instruction. Thus non-coprocessor or unrecognized instructions are immediately dropped from the instruction queue and are never passed on. The coprocessor also compares the coprocessor number field in a coprocessor instruction and compares it with its own. If the number doesn't match, the instruction is invalid. The buffer flags 940 and 950 and the multiplexers 960, 970 operate in the same manner as described earlier with reference to the buffer flags 640, 650 and multiplexers 60, 670 of FIG. 6.

2.6 Instruction Tagging

It is sometimes necessary for the core to be able to identify instructions in the coprocessor pipeline. This is necessary for flushing (which will be covered in detail later) so that the core can indicate to the coprocessor which instructions are to be flushed. The core therefore gives each instruction sent to the coprocessor a tag, which is drawn from a pool of values large enough so that all the tags in the pipeline at any moment are unique. Sixteen tags are plenty to achieve this in preferred embodiments, requiring a four-bit tag field. Each time a tag is assigned to an instruction, the tag number is incremented modulo 16 to generate the next tag.

The flushing mechanism is simplified if successive coprocessor instructions have contiguous tags. This is achieved by only incrementing the tag number when the instruction passed to the coprocessor is a coprocessor instruction. This is done after sending the instruction, so the tag changes after a coprocessor instruction is sent, rather than before. It is not possible to increment the tag before sending the instruction as the core has not yet had time to decode the instruction to determine what kind of instruction it is. When the coprocessor decode stage 205 removes the non-coprocessor instructions, it is left with an instruction stream carrying contiguous tags.

The tags may also be used to verify that the sequence of tokens moving down the queues matches the sequence of instructions moving down the core and coprocessor pipelines.

3 Operation

The way the GCP interface functions will now be discussed by illustrating the various operations that may be performed and events that may take place. The figures accompanying the discussions show the passing of tokens down the various queues, across the interface between the two pipelines. The identity of each queue may be deduced by observing the start and end point and referring to FIG. 3.

3.1 Normal Operation

Figure 10:
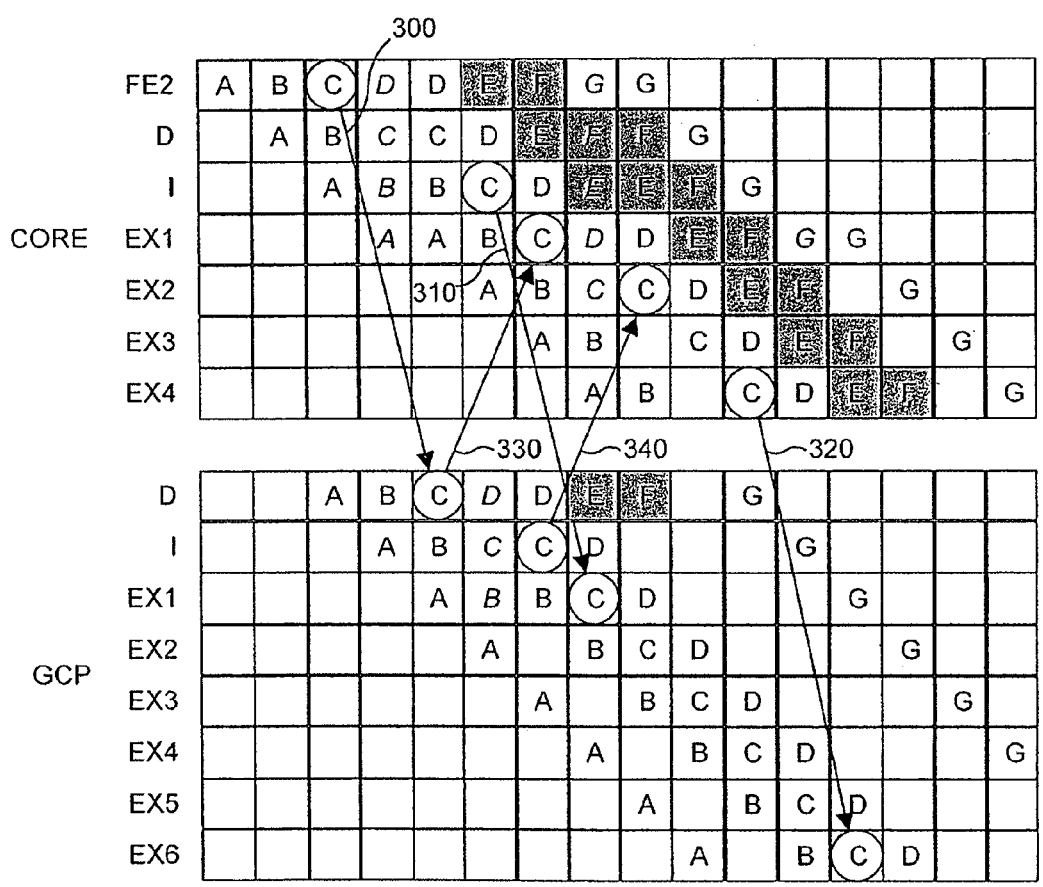
FIG. 10 is a diagram schematically illustrating the normal operation of the interactions between the core and coprocessor pipelines.

FIG. 10 shows normal operation of the core and coprocessor pipelines.

In normal operation the core passes all instructions across to the coprocessor via the instruction queue 300 and then increments the tag if the instruction was a coprocessor instruction. The coprocessor decodes the instruction and throws it away if it is not a coprocessor instruction or if it contains the wrong coprocessor number. Each coprocessor instruction then passes down the pipeline, sending a token down the length queue 330 as it moves into the issue stage. The instruction then remains in the issue stage until it has received a token from the cancel queue 310. If the cancel token does not request that the instruction is cancelled, it moves on to the EX1 stage, placing a token onto the accept queue 340. The instruction then moves down the pipeline until it reaches the EX6 stage. At this point it waits to receive a token from the finish queue 320, which allows it to retire.

FIG. 10 shows how the time taken for the coprocessor to respond with a token down the length queue 330 causes the core pipeline to stall in its EX1 stage for instruction A, while waiting for the token. This delay, in turn, causes instruction B to wait in the coprocessor pipeline stage EX1 for the token sent by the core when B leaves its issue stage. Instruction B is consequently late arriving at EX6 and finds that the token in the finish queue has been waiting there for one cycle. By the time instruction C arrives at the bottom of the pipeline, however, the two pipelines are once more in synchronisation.

It is clear from FIG. 10 that the execution of a coprocessor pipeline gives rise to a timing penalty of one cycle, as an instruction stalls in the core's issue stage. The next two instructions, though, take advantage of this stall so that the penalty is shared. If all the instructions passing down the pipeline were coprocessor instructions there would be a stall for every third instruction, so the penalty comes down to an extra third of a cycle per coprocessor instruction. If coprocessor instructions are sparse in the pipeline, on the other hand, the single cycle penalty is incurred for each coprocessor instruction. The average timing penalty thus decreases as the proportion of coprocessor instructions rises.

3.2 Stalls

Figure 11:
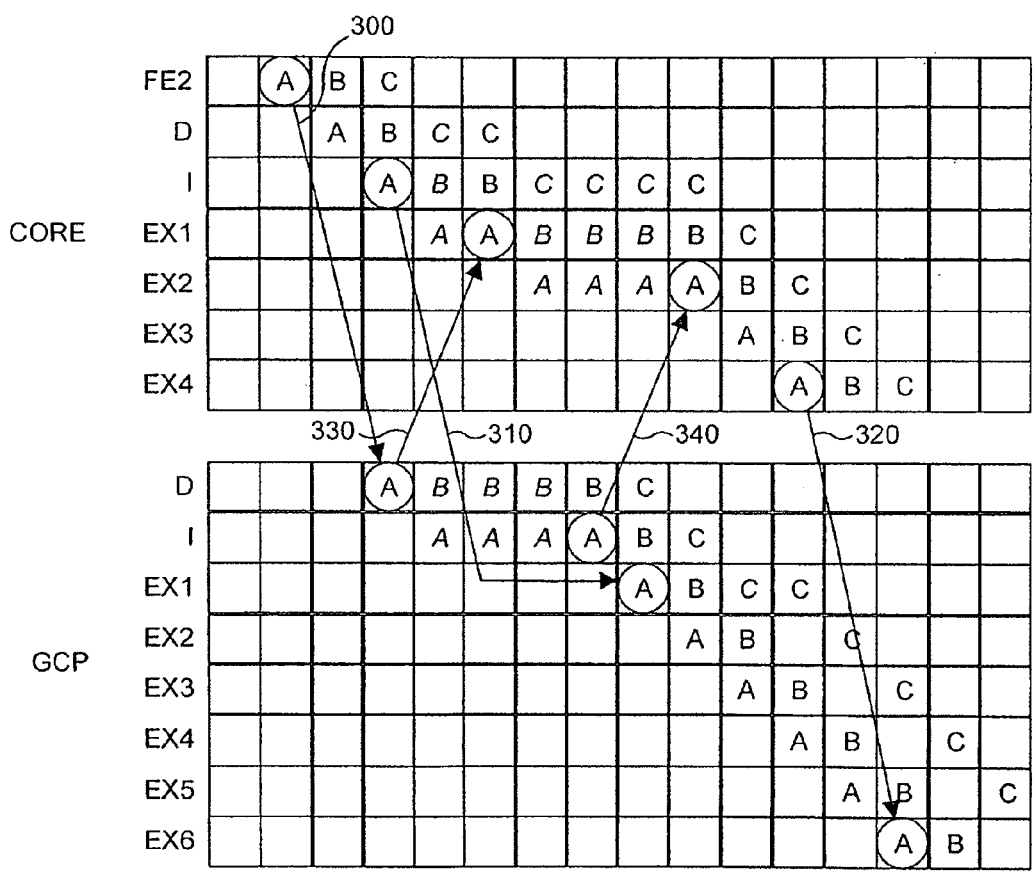
FIG. 11 is a diagram illustrating how the core and coprocessor pipelines behave when the coprocessor stalls in its issue stage in accordance with one embodiment of the present invention.

FIG. 11 shows how the core and coprocessor pipelines behave when the coprocessor stalls in its issue stage.

The passage of the coprocessor instruction A down the pipelines begins in the normal way, with an exchange of tokens as the instruction passes out of the core's issue stage and the coprocessor's decode stage. The instruction then stalls in the coprocessor's issue stage, delaying the passing of the token to the core's EX2 stage via the accept queue 340, which therefore stalls while it waits for it. When the instruction eventually moves on into the coprocessor's EX1 stage, it picks up the token previously posted by the instruction via the cancel queue 310 as it left the core's issue stage.

FIG. 11 also illustrates how the pipelines themselves limit the number of items that can be waiting in a queue at any one time. While instruction A is stalled in EX2 waiting for a token to appear on the accept queue 340 it prevents instruction C moving on and placing a token onto the cancel queue 310, although instruction B has already done so. The number of items waiting in the cancel queue is thereby limited to two. Similar mechanisms are at work in the other queues that pass tokens between the pipelines.

3.3 Cancels

Figure 12:
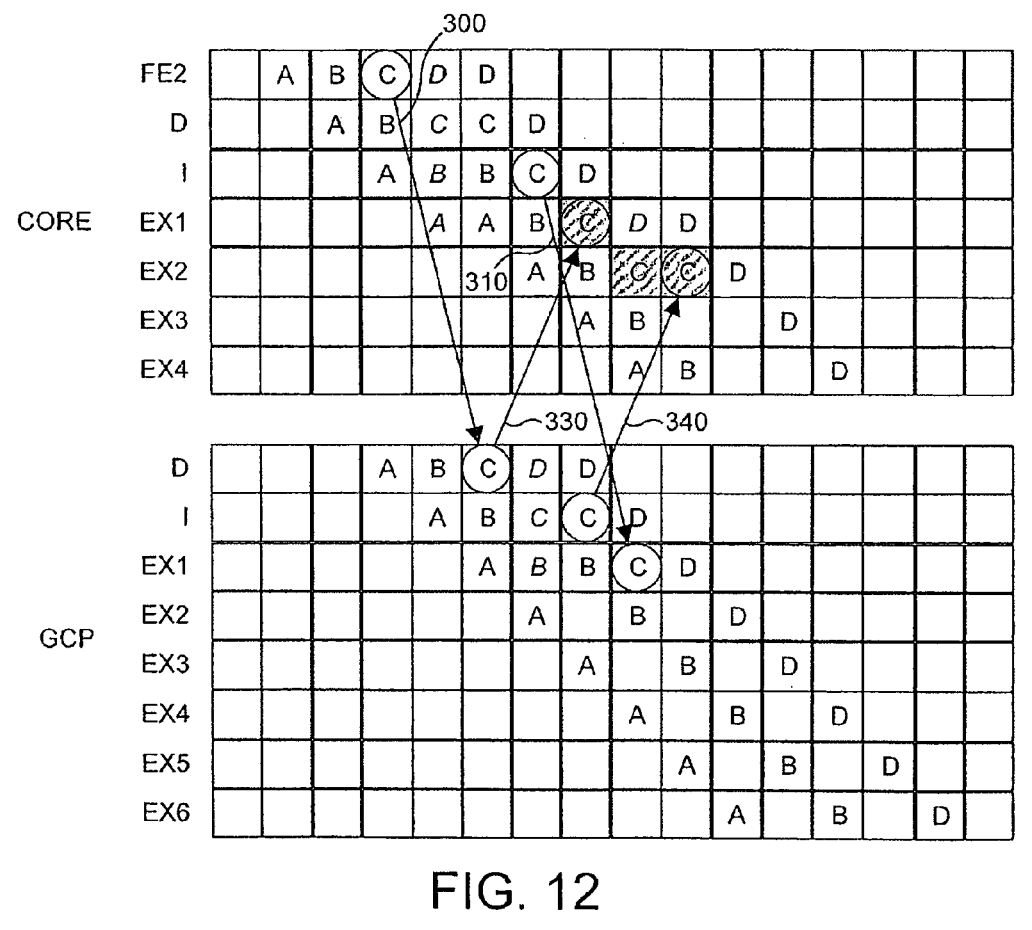

FIG. 12 shows how the core and coprocessor pipelines behave when a coprocessor instruction is cancelled by the core in its issue stage.

The instruction C proceeds normally down the core pipeline, sending a token down the instruction queue 300, until it reaches the issue stage. At this point it sends a token down the cancel queue 310, indicating that the instruction should be cancelled. Having done this it turns into a phantom within the core pipeline (as indicated by the shading) and proceeds down the pipeline as normal until the EX2 stage. It does this so that it can pick up the tokens sent by its counterpart in the coprocessor pipeline via the length queue 330 and accept queue 340. These will have been sent before the instruction in the coprocessor queue reads the token from the cancel queue 310. This keeps the passage of tokens down the queues correct by ensuring that each sending instruction has a corresponding receiving instruction in the other pipeline. The instruction C may finally expire as it leaves the core's EX2 stage, as it is no longer needed to pick up tokens. The instruction in the coprocessor pipeline will expire immediately on picking up the cancel token from the cancel queue 310 in the EX1 stage.

3.4 Bounces

Figure 13:
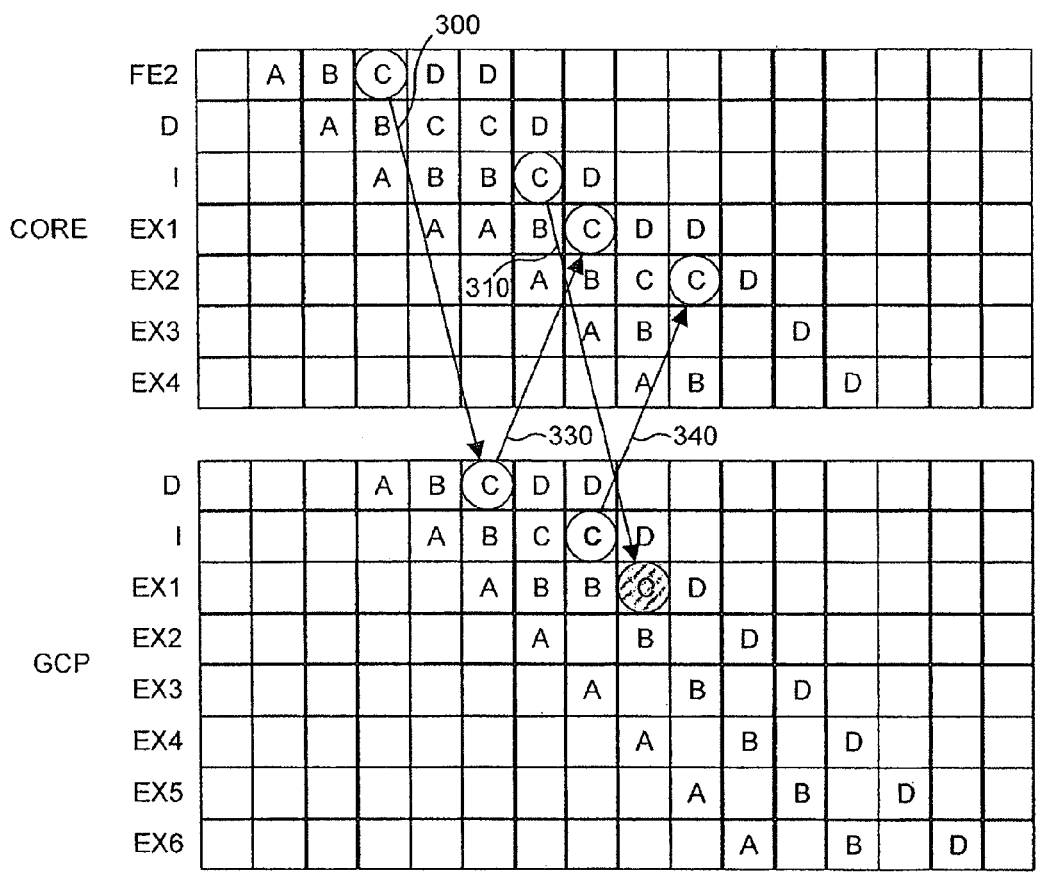
FIG. 13 is a diagram illustrating how the core and coprocessor pipelines behave when a coprocessor instruction is bounced by the coprocessor in accordance with one embodiment of the present invention.

FIG. 13 shows how the core and coprocessor pipelines behave when a coprocessor instruction is bounced (not accepted) by the coprocessor.

The instruction C passes down the coprocessor pipeline in a normal fashion, passing a token into the length queue 330, until it reaches the issue stage. At this point it sends a token down the accept queue 340, indicating that the instruction is not accepted by the coprocessor. Having done this it turns into a phantom and proceeds down the pipeline as normal until it leaves stage EX1 when it expires. It does this so that it can pick up the token sent down the cancel queue 310 by its counterpart in the core pipeline. The instruction in the core pipeline will expire immediately on picking up the accept token from the accept queue 340 in the EX2 stage.

Figure 14:
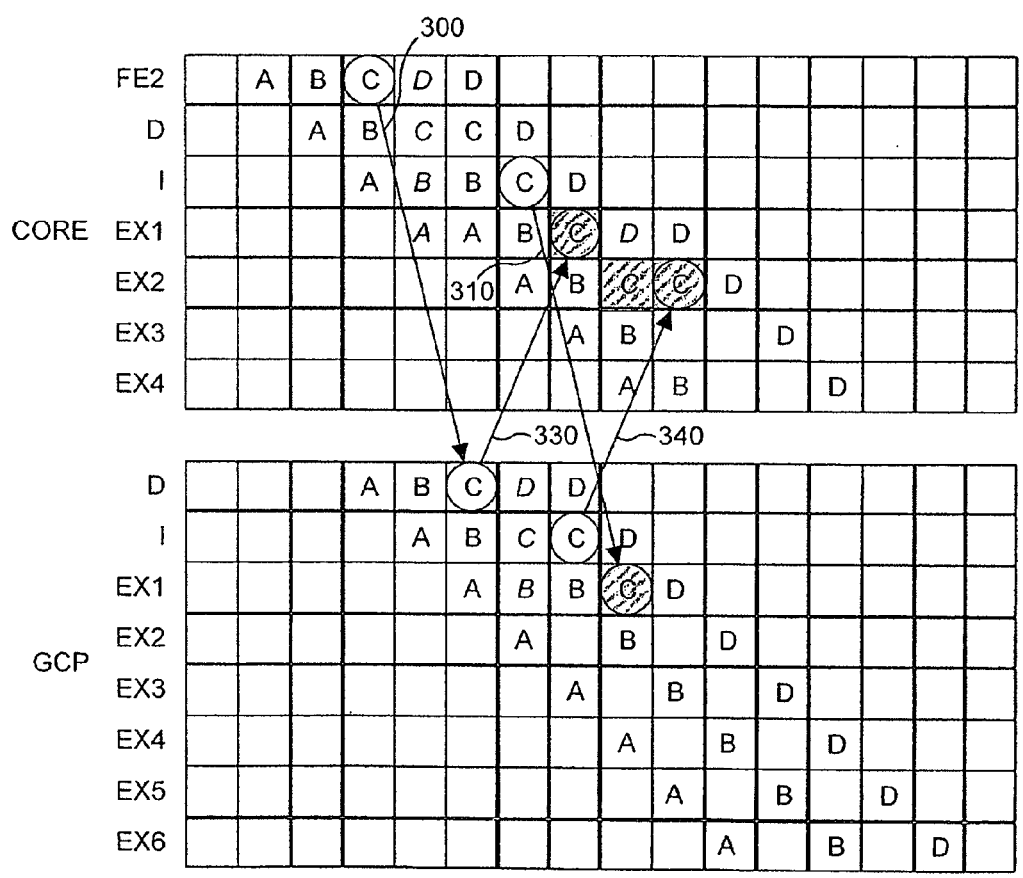
FIG. 14 is a diagram illustrating the manner in which the pipelines deal with an instruction that is cancelled by the core and also bounced by the coprocessor in accordance with one embodiment of the present invention.

The behaviour of instructions being bounced in the coprocessor pipeline is almost the same as those being cancelled in the core pipeline, and a good illustration of this mechanism is provided by the way the pipelines deal with an instruction that is cancelled by the core and also bounced by the coprocessor. FIG. 14 shows this situation.

In this situation both pipelines have created a phantom whose sole purpose is to pick up tokens from the other pipeline or, in the case of the coprocessor, to provide a tag for matching during a flush. Each receives a token telling it to expire, but this information is redundant because, as a phantom, it is already doomed.

3.5 Flushes

Figure 15:
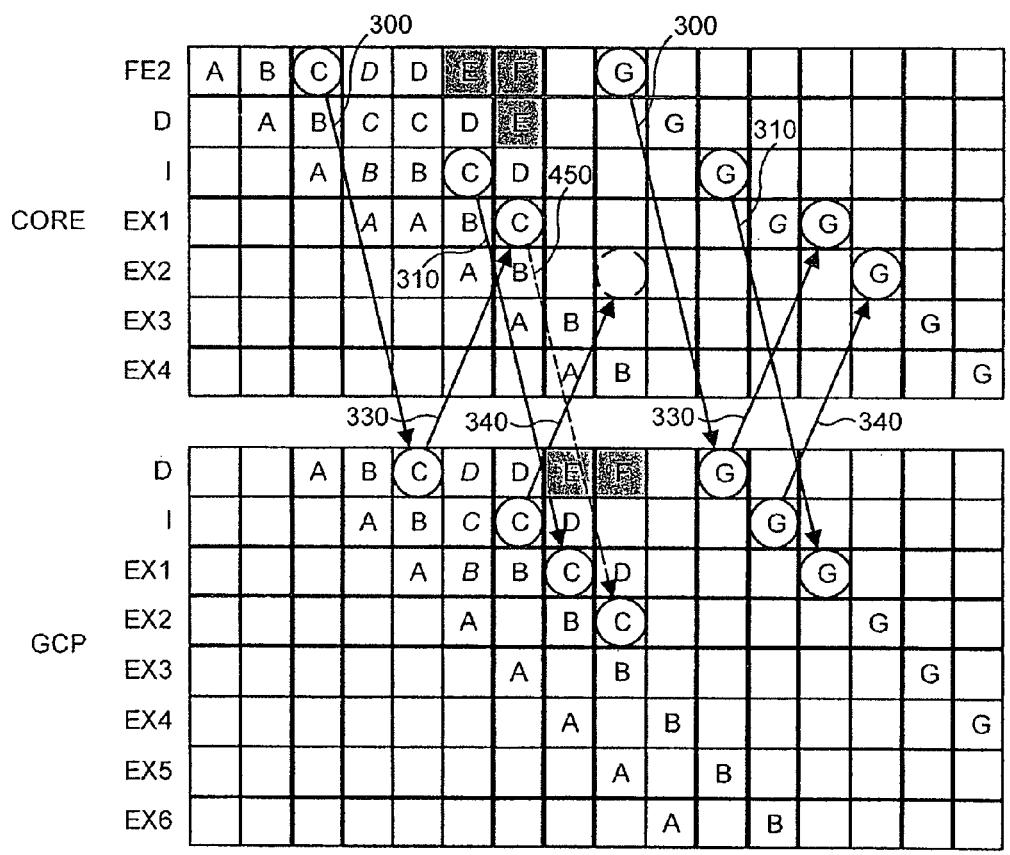
FIG. 15 is a diagram illustrating how the core and coprocessor pipelines behave when the core sends a flush signal to the coprocessor in accordance with one embodiment of the present invention.

FIG. 15 shows how the core and coprocessor pipelines behave when the core sends a flush signal to the coprocessor.

A flush may be triggered by the core in any stage from issue to EX4 inclusive. This information could be passed to the coprocessor pipeline through a series of queues, but this scheme would proliferate queues unnecessarily. Instead tagging is used so that a single broadcast signal can be sent to the coprocessor identifying the instruction to be flushed by sending the corresponding tag. The coprocessor must then find all instructions that have a tag the same as, or later than, the flush tag, and remove them. Unlike tokens passing down a queue, a flush signal has a fixed delay so that the timing relationship between a flush in the core and a flush in the coprocessor is known precisely.

In FIG. 15, instruction C triggers a flush when it reaches the EX1 stage in the core. It therefore expires on the next cycle, taking with it all the instructions following it in the pipeline. As it expires it sends a broadcast signal 450 (shown by the dotted arrow in the figure) to the coprocessor pipeline. When the coprocessor receives this signal it looks up the pipeline for matching tags and removes all instructions from that point upwards which, in FIG. 15, are instructions C, D and F (a core instruction in the decode stage which was about to expire in any case). The instructions A and B carry on down the pipeline as they predate the flushing point.

Most of the token queues also need flushing and this may also be done using the tags attached to each instruction. If a match has been found before the stage at the receiving end of a token queue is passed, then the token queue is simply cleared. Otherwise, it must be properly flushed by matching the tags in the queue. This operation must be performed on all the queues except the finish queue 320, including the store queue 400. Therefore, the coprocessor must flush the instruction 300 and cancel 310 queues and the core must flush the length 330, accept 340, and store 400 queues.

The flushing operation may be carried out by the coprocessor as soon as the flush signal is received, and is simplified because the queues will be performing no other operation. This means that flushing does not need to be combined with queue updates. Examination of FIG. 15 shows that there is a single cycle following flush in which nothing happens which affects the flushed queues, which is a good opportunity to carry out the queue flushing operation. This, however, does not apply to the load or store queues, which will be discussed later.

Figure 16:
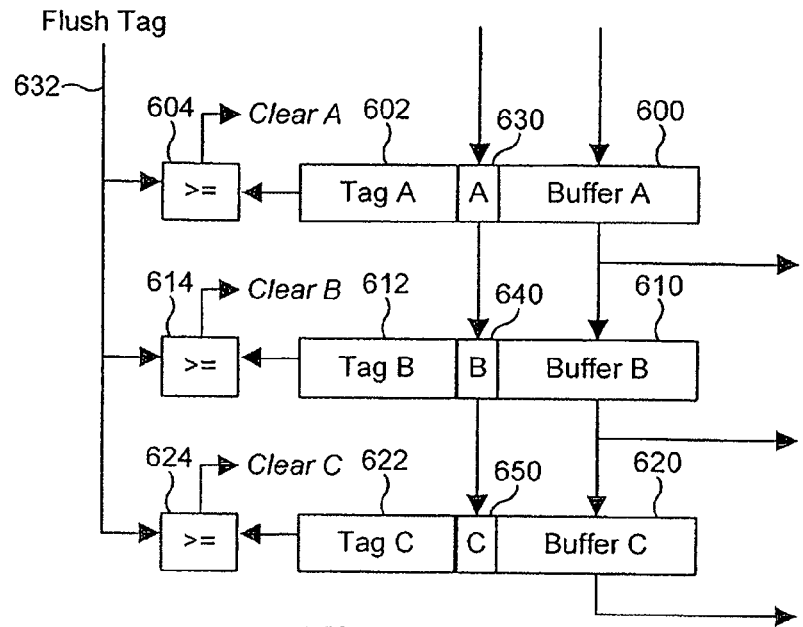
FIG. 16 is a diagram schematically illustrating the queue flushing approach used in one embodiment of the present invention.

A flush command has associated with it a tag value indicating where the flush should start. This is matched with the tag carried by every instruction. If the queue is to be flushed, each buffer with the same or a newer tag is cleared. FIG. 16 provides an illustration of queue flushing.

Each buffer 600, 610, 620 in the queue has a tag comparator 604, 614, 624 associated with it. The flush tag 632 is presented to each comparator, to be compared with the tag 602, 612, 622 belonging to each valid instruction held in the queue. If a buffer's tag is greater than or equal to the flush tag, the buffer in the queue has its full flag cleared, to indicate that it is now empty.

3.6 Retirement

When an instruction reaches the bottom of the coprocessor pipeline it will want to retire. How it retires depends on the kind of instruction it is and whether it is iterated or not. A CDP instruction retires when it finds a token to meet it in the finish queue 320.

The conditions under which load and store instructions may retire are discussed in later sections.

4 Data Transfers

4.1 General

Figure 17:
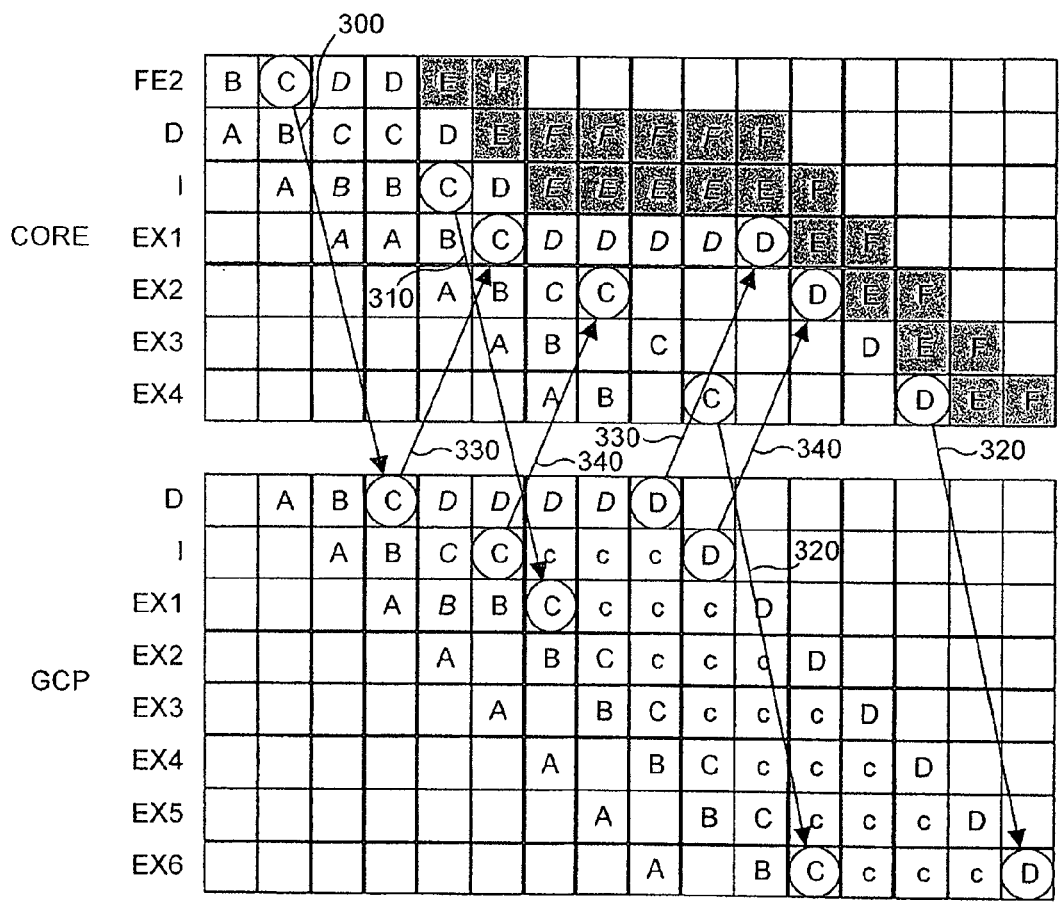
FIG. 17 is a diagram illustrating instruction iteration for a vectored load instruction "C" in accordance with one embodiment of the present invention.

Data transfers are managed by the LSU 222, on the core side, and the pipeline itself, on the coprocessor side. Transfers can be a single value or a vector. In the latter case, the coprocessor converts a multiple transfer, effectively, into a series of single transfers by iterating the instruction in the issue stage. This creates an instance of the load or store instruction for each item to be transferred. The instruction stays in the coprocessor issue stage while it iterates, creating copies of itself. For loads, these move down the pipeline so that they can pick up each data item from the load queue 410 as it arrives at the EX6 stage. For stores, the iterated instructions do not pass out of the issue stage but disappear as they are created, generating store data on each iteration for placing in the store queue 400. FIG. 17 shows an example for a load instruction C. The first of the iterated instructions (shown in uppercase) is the head and the others (shown in lowercase) are the tails. In the example shown the vector length is 4 so there is one head and three tails.

Only the head instruction is involved in token exchange with the core pipeline, which doesn't iterate instructions in this way, the tail instructions passing down the coprocessor pipeline silently. When an iterated load instruction is cancelled or flushed, all the tail instructions (bearing the same tag) must be removed from the pipeline. Only the head instruction becomes a phantom when cancelled; the tails are removed completely.

4.2 Loads

Load data emerge from the WB stage 250 of the core LSU 222 and are received by the coprocessor EX6 stage 275 from the load queue 410. Each item in a vectored load is picked up by one instance of the iterated load instruction. The pipeline timing is such that a load instruction will always be ready, or just arrived, in EX6 to pick up each data item. If a load instruction has arrived in EX6, but the load information has not yet appeared, the load instruction must stall in EX6, stalling the rest of the coprocessor pipeline. Thus, a load instruction retires when it meets load data.

4.2.1 Load Buffers

Figure 18:
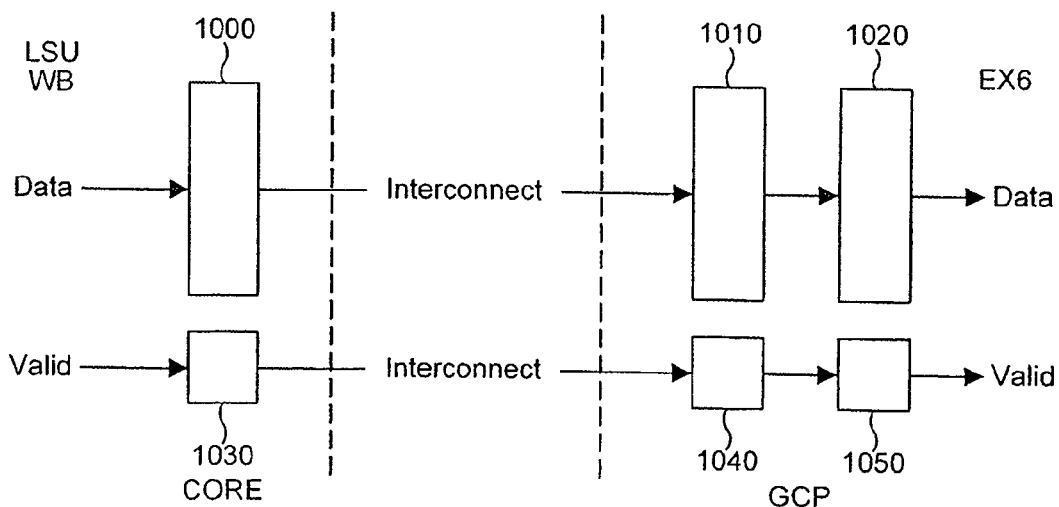
FIG. 18 is a diagram schematically illustrating the buffering of load data in accordance with one embodiment of the present invention.

In order to achieve correct alignment of the load data with the load instruction in the coprocessor EX6 stage, the data need to be double buffered when they arrive at the coprocessor. FIG. 18 provides an illustration.

Figure 19:
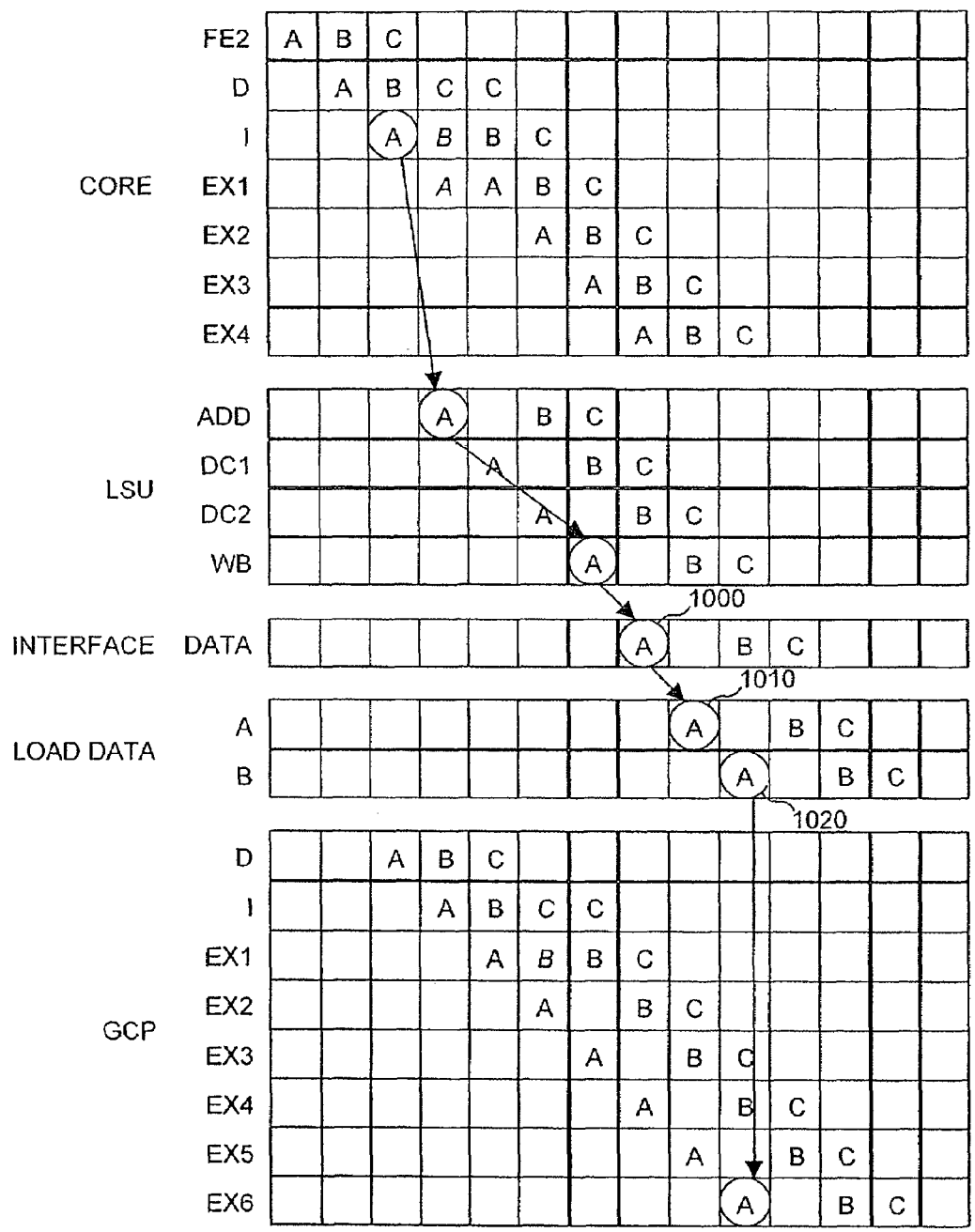
FIG. 19 is a diagram illustrating how a load instruction in the core enters the load store unit of the core and initiates the generation of one item of load data, which then passes to the coprocessor, in accordance with one embodiment of the present invention.

The load data buffers function as pipeline registers and so require no flow control and do not need to carry any tags. The only requirements are the data and a valid bit. Each item of load data emerging from the WB stage 250 of the core LSU 222 is placed in a core buffer 1000, with its corresponding valid bit stored in buffer 1030. The data item and associated valid bit is then passed over the interface to the GCP, where it is passed through buffers 1010, 1040 and 1020, 1050 in turn. FIG. 19 shows how a load instruction in the core enters the core LSU and initiates the generation of one item of load data, which then passes to the coprocessor via the core interface buffer 1010 and the double buffers 1020, 1030 of the GCP, meeting the coprocessor load instruction at EX6.

For this form of data buffering to work for load transfers, it is required that the two pipelines will be synchronised in such a way that instructions always arrive in the coprocessor EX6 coincident with, or before, the arrival of the corresponding instruction in the core EX4 stage. It is also required that the tokens moving down the finish queue 320 from the core arrive at the same time as the corresponding load data items arrive at the end of the load data pipeline buffers. These conditions will be satisfied provided that the coprocessor pipeline will only stall after the issue stage in response to the lack of a token in the finish queue 320, and provided that the LSU 222 sees the token from the accept queue 340 before it allows a load instruction to move on from its ADD stage 220. In addition, WB stalls must delay sending of load data from the LSU.

4.2.2 Flushes

No flush which does not involve the core EX4 stage 290 can affect the load data buffers, and the load transfer will complete normally. If a flush is initiated by an instruction in the core EX4 stage, this will not be a load instruction, as load instructions cannot trigger a flush. Any coprocessor load instructions behind the flush point will find themselves stalled if they get as far as the EX6 stage 275 of the coprocessor pipeline, for the lack of a finish token, so no data transfers will have taken place. Any data in the load data buffers 410 will expire naturally during the flush dead period while the pipeline reloads.

4.2.3 Cancels

If a load instruction is cancelled, both the head and any tails must be removed, with the head only being replaced by a phantom. As the cancellation will happen in the coprocessor EX1 stage 225, no data transfers will have taken place and therefore no special measures need to be taken to deal with load data.

4.2.4 Retirement

When a load instruction reaches the bottom of the coprocessor pipeline it must find a data item at the end of the load data buffer 410. If the instruction is a head instruction, it must also find a token in the finish queue 320. Tail instructions require only that load data be present, but require no token from the finish queue.

4.3 Stores

Store data emerge from the coprocessor issue stage 215 and are received by the core LSU DC1 stage 230. Each item of a vectored store is generated as the store instruction iterates in the coprocessor issue stage. The iterated store instructions have no further use and are not passed down the coprocessor pipeline. Only the head instruction passes down the pipeline. This means that a store iteration, once started, will not stop unless stopped explicitly by the core. In particular, if the store head instruction is stalled in the EX1 stage of the coprocessor pipeline, the iteration continues and is unaffected by the stall.

4.3.1 Store Data Queue

As the store data transfer may be stopped at any time by the LSU 222, a store data queue 400 is required. Furthermore, as store data vectors may be of arbitrary length, flow control is required and this has already been discussed in section 2.5.3. A queue length of three slots is just sufficient to allow flow control be used without loss of data.

4.3.2 Flushes

When a store instruction is involved in a flush, the store data queue 400 must be flushed by the core. As the queue will continue to fill for two cycles after the core notifies the coprocessor of the flush (because of the signal propagation delay) the core must delay for two cycles before carrying out the store data queue 400 flush. The dead period after the flush extends sufficiently far to allow this to be done.

4.3.3 Cancels

If the core cancels a store instruction it will know that the instruction is cancelled before it starts to receive store data. By the time the coprocessor receives and acts upon the cancel signal it will already have sent one data item down the store data queue 400. The core must therefore remove and dispose of this single item after cancellation. This may be achieved by sending a single store instruction phantom through the LSU 222 to pick up the dead data. Alternatively, the issue stage may look ahead into the cancel queue to determine that the store instruction will not be cancelled before beginning to send data.

4.3.4 Retirement

Store instructions make no use of the finish token queue 320 and therefore retire as soon as they reach the bottom of the coprocessor pipeline.

5 Multiple Coprocessors

There may be more than one coprocessor attached to the core and so some means may be required for dealing with multiple coprocessors. It is important, for reasons of economy, to ensure that as little as possible of the coprocessor interface is duplicated. In particular, the coprocessors should share the length 330, accept 340 and store data 400 queues, which are maintained by the core. If these queues are to be shared, only one coprocessor may use the queues at any time. This is most easily guaranteed by allowing only one coprocessor to be active at any time. This is not a serious limitation as, generally speaking, only one coprocessor should be in use at any time. Typically, a processor would be driven through driver software, which will drive just one coprocessor. Calls to the driver software and returns from it will ensure that there are several core instructions between the use of one coprocessor and the use of a different coprocessor.

5.1 Interconnect Considerations

If only one coprocessor is allowed to communicate with the core at any time, all coprocessors may share the GCP interface signals from the core. Signals from the coprocessors to the core may simply be ORed together, provided that every coprocessor holds its outputs to zero when it is inactive.

5.2 Coprocessor Selection

Coprocessors are enabled by a signal from the core. There are 16 of these signals in preferred embodiments, one for each coprocessor, and only one may be active at any time. In addition, instructions to the coprocessors will include the coprocessor number, allowing the coprocessor to reject instructions that don't match their own number, as well as rejecting core instructions.

5.3 Coprocessor Switching

When the core decodes a coprocessor instruction destined for a different coprocessor to that last addressed, it stalls this instruction until the previous coprocessor instruction has been retired. This ensures that all activity in the currently selected coprocessor has ceased. The coprocessor selection is then switched, disabling the last active coprocessor and activating the new coprocessor. The coprocessor which should have received the new coprocessor instruction will have ignored it, being disabled. The instruction needs therefore to be resent by the core, and will now be accepted by the newly activated coprocessor.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
    a main processor that executes a sequence of instructions, the main processor comprising a first pipeline having a first plurality of pipeline stages;
    a coprocessor that executes coprocessor instructions in said sequence of instructions, the coprocessor comprising a second pipeline having a second plurality of pipeline stages, and each one of the coprocessor instructions being arranged to be routed through both the first pipeline and the second pipeline; and
    at least one synchronizing queue including a first-in-first-out (FIFO) buffer having a predetermined plurality of entries and coupling a predetermined pipeline stage in one of the first or second pipeline with a partner pipeline stage in the other one of the first or second pipeline, the predetermined pipeline stage placing a token in an entry of the synchronizing queue when processing one of the coprocessor instructions, the token including a tag which uniquely identifies said one of the coprocessor instructions to which the token relates, and the partner pipeline stage processing the corresponding one of the coprocessor instructions upon receipt of the token from the synchronizing queue, thereby synchronizing the first and second pipelines between the predetermined pipeline stage and the partner pipeline stage without passing signals with fixed timing between the first and second pipelines.

2. A data processing apparatus as claimed in claim 1, further comprising a plurality of said synchronizing queues each of said synchronizing queues coupling the predetermined pipeline stage in one of the first or second pipeline with the partner pipeline stage in the other one of the first or second pipeline.

3. A data processing apparatus as claimed in claim 1, wherein one of the at least one synchronizing queues is an instruction queue, the predetermined pipeline stage is in the first pipeline and places the token identifying said one of the coprocessor instructions in the instruction queue, and the partner pipeline stage is in the second pipeline and upon receipt of the token begins processing the corresponding one of the coprocessor instructions identified by the token.

4. A data processing apparatus as claimed in claim 3, wherein the predetermined pipeline stage is a fetch stage in the first pipeline and the partner pipeline stage is a decode stage in the second pipeline, said decode stage decoding the corresponding one of the coprocessor instructions upon receipt of the token.

5. A data processing apparatus as claimed in claim 4, wherein the fetch stage in the first pipeline places the token in the instruction queue for each instruction in the sequence of instructions, and the decode stage in the second pipeline decodes said each instruction upon receipt of the associated token in order to determine whether said each instruction is the corresponding one of the coprocessor instructions that requires further processing by the coprocessor.

6. A data processing apparatus as claimed in claim 1, wherein one of the at least one synchronizing queues is a cancel queue, the predetermined pipeline stage is in the first pipeline and places in the cancel queue the token identifying whether said one of the coprocessor instructions at the predetermined pipeline stage is to be cancelled, and the partner pipeline stage is in the second pipeline and upon receipt of the token from the cancel queue, and if the token identifies that said one of the coprocessor instructions is to be cancelled, to cancel the corresponding one of the coprocessor instructions.

7. A data processing apparatus as claimed in claim 6, wherein the predetermined pipeline stage is an issue stage in the first pipeline, and the partner pipeline stage is a stage following an issue stage in the second pipeline.

8. A data processing apparatus as claimed in claim 6, wherein the partner pipeline stage upon receipt of the token from the cancel queue, and if the token identifies that said one of the coprocessor instructions is to be cancelled, to remove the corresponding one of the coprocessor instructions from the second pipeline.

9. A data processing apparatus as claimed in claim 1, wherein one of the at least one synchronizing queues is a finish queue, the predetermined pipeline stage is in the first pipeline and places in the finish queue the token identifying permission for said one of the coprocessor instructions at said predetermined pipeline stage to be retired from the second pipeline, and the partner pipeline stage is in the second pipeline and upon receipt of the token from the finish queue, and if the token identifies that said one of the coprocessor instructions is permitted to be retired, to retire the corresponding one of the coprocessor instructions.

10. A data processing apparatus as claimed in claim 9, wherein the predetermined pipeline stage is a write back stage in the first pipeline, and the partner pipeline stage is a write back stage in the second pipeline.

11. A data processing apparatus as claimed in claim 1, wherein one of the at least one synchronizing queues is a length queue, the predetermined pipeline stage is in the second pipeline and places in the length queue the token identifying length information for a vectored coprocessor instruction, and the partner pipeline stage is in the first pipeline and upon receipt of the token from the length queue factors the length information into the further processing of the vectored coprocessor instruction within the first pipeline.

12. A data processing apparatus as claimed in claim 11, wherein the predetermined pipeline stage is a decode stage in the second pipeline, and the partner pipeline stage is a first execute stage in the first pipeline.

13. A data processing apparatus as claimed in claim 1, wherein one of the at least one synchronizing queues is an accept queue, the predetermined pipeline stage is in the second pipeline and places in the accept queue the token identifying whether said one of the coprocessor instructions in the predetermined pipeline stage is to be accepted for execution by the coprocessor, and the partner pipeline stage is in the first pipeline and upon receipt of the token from the accept queue, and if the token identifies that said one of the coprocessor instructions is not to be accepted, to reject the corresponding one of the coprocessor instructions by the main processor.

14. A data processing apparatus as claimed in claim 13, wherein the predetermined pipeline stage is an issue stage in the second pipeline, and the partner pipeline stage is a second execute stage in the first pipeline.

15. A data processing apparatus as claimed in claim 14, wherein the partner pipeline stage upon receipt of the token from the accept queue, and if the token identifies that said one of the coprocessor instructions is not to be accepted, to remove the corresponding one of the coprocessor instructions from the first pipeline.

16. A data processing apparatus as claimed in claim 1, wherein one of the at least one synchronizing queues is a store queue used when said one of the coprocessor instructions is a store instruction to transfer data items from the coprocessor to memory accessible by the main processor, the predetermined pipeline stage is in the second pipeline and when processing the store instruction places in the store queue the token identifying each of the data items to be transferred, and the partner pipeline stage is in the first pipeline and upon receipt of the token from the store queue, transfers the corresponding data item to the memory.

17. A data processing apparatus as claimed in claim 16, wherein the predetermined pipeline stage is an issue stage in the second pipeline, and the partner pipeline stage is an address generation stage in the first pipeline.

18. A data processing apparatus as claimed in claim 1, wherein one of the at least one synchronizing queues is a load queue used when said one of the coprocessor instructions is a load instruction to transfer data items from memory accessible by the main processor to the coprocessor, the predetermined pipeline stage is in the first pipeline and when processing the load instruction places in the load queue the token identifying each of the data items to be transferred, and the partner pipeline stage is in the second pipeline and upon receipt of the token from the load queue, transfers the corresponding data item to the coprocessor.

19. A data processing apparatus as claimed in claim 17, wherein the predetermined pipeline stage is a write back stage in the first pipeline, and the partner pipeline stage is a write back stage in the second pipeline.

20. A data processing apparatus as claimed in claim 18 wherein one of the at least one synchronizing queues is a store queue used when said one of the coprocessor instructions is a store instruction to transfer data items from the coprocessor to the memory accessible by the main processor, the predetermined pipeline stage is in the second pipeline and when processing the store instruction places in the store queue the token identifying each of the data items to be transferred, and the partner pipeline stage is in the first pipeline and upon receipt of the token from the store queue, transfers the corresponding data item to the memory, and wherein the load instruction and the store instruction are vectored coprocessor instructions defining multiple data items to be transferred, and the apparatus further comprises flow control logic, associated with at least one of the load queue and the store queue, sending a control signal to the predetermined pipeline stage to stop issuance of the token by the predetermined pipeline stage whilst it is determined that the associated load or store queue may become full.

21. A data processing apparatus as claimed in claim 20, wherein the flow control logic is provided for the store queue, the flow control logic issuing the control signal upon receiving an indication from the main processor that the partner pipeline stage cannot accept the data item.

22. A data processing apparatus as claimed in claim 21, wherein the load queue is a double buffer.

23. A data processing apparatus as claimed in claim 1, wherein the main processor broadcasting, when it is necessary to flush the coprocessor instructions from both the first and the second pipelines, a flush signal to the coprocessor identifying the tag relating to the oldest one of the coprocessor instructions that needs to be flushed, the coprocessor identifying the oldest one of the coprocessor instructions from the tag and flushing from the second pipeline the oldest one of the coprocessor instructions and any of the coprocessor instructions subsequent to said oldest one of the coprocessor instructions identified within the coprocessor.

24. A data processing apparatus as claimed in claim 23, wherein one or more of said at least one synchronizing queues are flushed in response to said flush signal, with the tag being used to identify which of the tokens within the one or more of the at least one synchronizing queues are to be flushed.

25. A data processing apparatus as claimed in claim 1, wherein a plurality of said coprocessors are provided, with each one of the at least one synchronizing queue coupling one of the first plurality of pipeline stages in the main processor with one of the second plurality of pipeline stages in one of the coprocessors.

26. A data processing apparatus as claimed in claim 1, wherein the data processing apparatus has a synchronous design, such that the token is placed in the at least one synchronizing queue by the predetermined pipeline stage and is received from the at least one synchronizing queue by the partner pipeline stage upon changing edges of a clock cycle.

27. A method of synchronization between pipelines in a data processing apparatus comprising the steps of:
executing a sequence of instructions by a main processor having a first pipeline with a first plurality of pipeline stages;
executing coprocessor instructions in said sequence of instructions by a coprocessor having a second pipeline with a second plurality of pipeline stages, wherein each of the coprocessor instructions being arranged to be routed through both the first pipeline and the second pipeline;
(a) coupling a predetermined pipeline stage in one of the first or second pipeline with a partner pipeline stage in the other one of the first or second pipeline via a synchronizing queue including a first-in-first-out (FIFO) buffer having a predetermined plurality of entries;
(b) placing a token in an entry of the synchronizing queue when the predetermined pipeline stage is processing one of the coprocessor instructions, the token including a tag which uniquely identifies said one of the coprocessor instructions to which the token relates;
(c) upon receipt of the token from the synchronizing queue by the partner pipeline stage, processing the corresponding one of the coprocessor instructions within the partner pipeline stage;
synchronizing the first and second pipelines between the predetermined pipeline stage and the partner pipeline stage without passing signals with fixed timing between the first and second pipelines.

28. A method as claimed in claim 27 further comprising performing said steps (a) to (c) for each of a plurality of said synchronizing queues.

29. A method as claimed in claim 27 further comprising the steps of:
at said step (b), wherein the synchronizing queue is an instruction queue, the predetermined pipeline stage in the first pipeline places the token in the instruction queue identifying said one of the coprocessor instructions; and
at said step (c), upon receipt of the token, beginning processing of the corresponding one of the coprocessor instructions identified by the token within the partner pipeline stage in the second pipeline.

30. A method as claimed in claim 27 further comprising the steps of:
at said step (b), wherein the synchronizing queue is a cancel queue, the predetermined pipeline stage in the first pipeline places the token in the cancel queue identifying whether said one of the coprocessor instructions at the predetermined pipeline stage is to be cancelled; and
at said step (c), upon receipt of the token from the cancel queue by the partner pipeline stage in the second pipeline, and if the token identifies that said one of the coprocessor instructions is to be cancelled, cancelling the corresponding one of the coprocessor instructions.

31. A method as claimed in claim 27 further comprising the steps of:
at said step (b), wherein the synchronizing queue is a finish queue, the predetermined pipeline stage in the first pipeline places in the finish queue the token identifying permission for said one of the coprocessor instructions at said predetermined pipeline stage to be retired from the second pipeline; and
at said step (c), upon receipt of the token from the finish queue by the partner pipeline stage in the second pipeline, and if the token identifies that said one of the coprocessor instructions is permitted to be retired, retiring the corresponding one of the coprocessor instructions.

32. A method as claimed in claim 27 further comprises the steps of:
at said step (b), wherein the synchronizing queue is a length queue, the predetermined pipeline stage in the second pipeline places in the length queue the token identifying length information for a vectored coprocessor instruction; and
at said step (c), upon receipt of the token from the length queue by the partner pipeline stage in the first pipeline, factoring the length information into the further processing of the vectored coprocessor instruction within the first pipeline.

33. A method as claimed in claim 27 further comprising the steps of:
at said step (b), wherein the synchronizing queue is an accept queue, the predetermined pipeline stage in the second pipeline places in the accept queue the token identifying whether said one of the coprocessor instructions in said predetermined pipeline stage is to be accepted for execution by the coprocessor; and
at said step (c), upon receipt of the token from the accept queue by the partner pipeline stage in the first pipeline, and if the token identifies that said one of the coprocessor instructions is not to be accepted, rejecting the corresponding one of the coprocessor instructions by the main processor.

34. A method as claimed claim 27 further comprising the steps of:
processing said one of the coprocessor instructions including a store instruction for transferring data items from the coprocessor to memory accessible by the main processor;
at said step (b), wherein the synchronizing queue is a store queue, when processing said store instruction, the predetermined pipeline stage in the second pipeline places in the store queue the token identifying each of the data items to be transferred; and
at said step (c), upon receipt of the token from the store queue by the partner pipeline stage in the first pipeline, transferring the corresponding data item to the memory.

35. A method as claimed in claim 27, further comprising the steps of:
processing said one of the coprocessor instructions including a load instruction for transferring data items from memory accessible by the main processor to the coprocessor;
at said step (b), wherein the synchronizing queue is a load queue, when processing the load instruction, the predetermined pipeline stage in the first pipeline places in the load queue the token identifying each of the data items to be transferred; and
at said step (c), upon receipt of the token from the load queue by the partner pipeline stage in the second pipeline, transferring the corresponding data item to the coprocessor.

36. A method as claimed in claim 35 further comprising the steps of:
processing said one of the coprocessor instructions including a store instruction for transferring data items from the coprocessor to the memory accessible by the main processor;
at said step (b), wherein the synchronizing queue is a store queue, when processing one of said store instructions, the predetermined pipeline stage in the second pipeline places in the store queue the token identifying each of the data items to be transferred; and
at said step (c), upon receipt of the token from the store queue by the partner pipeline stage in the first pipeline, transferring the corresponding data item to the memory; and
defining multiple data items to be transferred when the load instruction and the store instruction are vectored coprocessor instructions, and the method further comprises the step of:
(d) for at least one of the load queue and the store queue, sending a control signal to the predetermined pipeline stage to stop issuance of the token by the predetermined pipeline stage whilst it is determined that the associated load or store queue may become full.

37. A method as claimed in claim 36 further comprising the steps of: at said step (d), when said step (d) is performed for the store queue, issuing the control signal upon receiving an indication from the main processor that the partner pipeline stage cannot accept the data item.

38. A method as claimed in claim 27 further comprising the steps of:
when it is necessary to flush the coprocessor instructions from both the first and the second pipelines, broadcasting a flush signal from the main processor to the coprocessor identifying the tag relating to the oldest one of the coprocessor instructions that needs to be flushed; and
within the coprocessor, when it is necessary to flush the coprocessor instructions from both the first and the second pipelines, identifying from the tag the oldest one of the coprocessor instructions and flushing from the second pipeline the oldest one of the coprocessor instructions and any of the coprocessor instructions subsequent to said oldest one of the coprocessor instructions identified within the coprocessor.

39. A method as claimed in claim 38, further comprising the step of flushing the synchronizing queue in response to said flush signal, with the tag being used to identify which of the tokens within the synchronizing queue are to be flushed.

40. A method as claimed in claim 27, wherein a plurality of said coprocessors are provided, further comprising the steps of coupling one of the first plurality of pipeline stages in the main processor with one of the second plurality of pipeline stages in one of the coprocessors via the synchronizing queue.

41. A method as claimed in claim 27 further comprising the steps of placing the token in the synchronizing queue by the predetermined pipeline stage and receiving the token from the synchronizing queue by the partner pipeline stage upon changing edges of a clock cycle for having a synchronous design.

* * * * *